(12) United States Patent
Pang et al.

(10) Patent No.: US 12,401,987 B2
(45) Date of Patent: Aug. 26, 2025

(54) EMBEDDED SUBSCRIBER IDENTITY MODULE ESIM CARD IDENTIFICATION METHOD AND TERMINAL DEVICE

(71) Applicant: Honor Device Co., Ltd., Shenzhen (CN)

(72) Inventors: Yang Pang, Shenzhen (CN); Zhengbin Tan, Shenzhen (CN); Min Du, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 605 days.

(21) Appl. No.: 17/759,981

(22) PCT Filed: Mar. 5, 2021

(86) PCT No.: PCT/CN2021/079275
§ 371 (c)(1),
(2) Date: Aug. 2, 2022

(87) PCT Pub. No.: WO2021/185097
PCT Pub. Date: Sep. 23, 2021

(65) Prior Publication Data
US 2023/0064618 A1 Mar. 2, 2023

(30) Foreign Application Priority Data
Mar. 20, 2020 (CN) .......................... 202010201571.7

(51) Int. Cl.
*H04W 8/20* (2009.01)
*H04W 8/18* (2009.01)
*H04W 52/02* (2009.01)

(52) U.S. Cl.
CPC .......... *H04W 8/205* (2013.01); *H04W 8/183* (2013.01); *H04W 52/0229* (2013.01); *H04W 52/028* (2013.01)

(58) Field of Classification Search
CPC ............... H04W 52/028; H04W 8/183; H04W 52/0254; H04W 52/0229; H04W 8/205; Y02D 30/70
(Continued)

(56) References Cited

U.S. PATENT DOCUMENTS

| 10,285,043 B2 | 5/2019 | Kim et al. |
| 11,039,299 B2 | 6/2021 | Gui |

(Continued)

FOREIGN PATENT DOCUMENTS

| CN | 102655547 A | 9/2012 |
| CN | 104661210 A * | 5/2015 |

(Continued)

OTHER PUBLICATIONS

GSMA, "RSP Technical Specification", Version 3.0, Draft 18, Jul. 17, 2019, pp. 1-409.

*Primary Examiner* — David Q Nguyen
(74) *Attorney, Agent, or Firm* — Slater Matsil, LLP

(57) ABSTRACT

This application is applicable to the field of communications technologies, and provides an embedded subscriber identity module (eSIM) card identification method and a terminal device method. The method includes: after completing an initialization process, driving an eSIM card to be powered on; querying whether an activated profile exists in the eSIM card; and when a query result is that no activated profile exists in the eSIM card, powering off the eSIM card. When the eSIM card is not activated or no activated profile exists in the eSIM card, it indicates that a user does not need to use a related function or service of the eSIM card. In this case, the eSIM card is powered off. When the eSIM card is not activated, it means that no profile exists in the eSIM card.

20 Claims, 21 Drawing Sheets

(58) Field of Classification Search
USPC .................................. 455/558, 557, 556.1
See application file for complete search history.

(56) References Cited

U.S. PATENT DOCUMENTS

| | | |
|---|---|---|
| 2012/0225621 A1 | 9/2012 | Li et al. |
| 2013/0344855 A1* | 12/2013 | Li ..................... H04M 3/543 |
| | | 455/417 |
| 2014/0128021 A1* | 5/2014 | Walker ............. H04W 68/005 |
| | | 455/405 |
| 2019/0050704 A1 | 2/2019 | Yi et al. |
| 2019/0357044 A1 | 11/2019 | Park |

FOREIGN PATENT DOCUMENTS

| | | |
|---|---|---|
| CN | 108920200 A | 11/2018 |
| CN | 109788470 A | 5/2019 |
| CN | 109933187 A | 6/2019 |
| CN | 110083220 A | 8/2019 |
| EP | 3261370 B1 | 3/2020 |
| WO | 2018133271 A1 | 7/2018 |
| WO | 2019119544 A1 | 6/2019 |

\* cited by examiner

EMBEDDED SUBSCRIBER IDENTITY MODULE ESIM CARD IDENTIFICATION METHOD AND TERMINAL DEVICE

CROSS-REFERENCE TO RELATED APPLICATIONS

This application is a National Stage of International Application No. PCT/CN2021/079275, filed Mar. 5, 2021, which claims priority to Chinese Patent Application No. 202010201571.7, filed Mar. 20, 2020, both of which are hereby incorporated by reference in their entireties.

TECHNICAL FIELD

This application belongs to the field of communications technologies, and in particular, to an embedded subscriber identity module eSIM (embedded Subscriber Identity Module) card identification method and a terminal device.

BACKGROUND

An eSIM card means that a conventional SIM card is directly embedded into a device chip instead of being added as an independent removable component. A user does not need to insert a physical SIM card.

In addition to a change in a physical form, a new difference between the eSIM and the conventional SIM is that the eSIM is programmable, and supports remote configuration of the SIM card by using an over-the-air technology (Over-the-Air Technology, OTA), to implement download, installation, activation, deactivation, and deletion of an operator profile. However, after the conventional SIM card is produced, key information inside the card cannot be changed.

For user equipment (User Equipment, UE) with a pre-installed eSIM card, the UE maintains the eSIM in a power-on state after startup. This increases power consumption of the UE.

SUMMARY

Embodiments of this application provide an embedded eSIM-based method and a terminal device, to resolve a problem that power consumption of UE is increased because the UE maintains the eSIM in a power-on state after startup.

According to a first aspect, this application provides a terminal device, including:
an embedded eSIM chip, configured to download or store a profile;
at least one processor, configured to receive a startup command, and perform an initialization process in response to the startup command; and
a modem, configured to: after the initialization process is completed, drive an eSIM card to be powered on; send a first indication to the eSIM card, where the first indication is used to query whether the eSIM card is activated or whether an activated profile exists in the eSIM card; obtain first feedback information sent by the eSIM card, where the first feedback information includes an eSIM card activation indicator; and power off the eSIM card when the eSIM card activation indicator indicates that the eSIM card is not activated or no activated profile exists in the eSIM card.

In the foregoing solution, in an application scenario in which the UE is started or restarted, after the eSIM card is powered on, a profile corresponding to the eSIM card is not downloaded or activated because the eSIM card is not activated. In this case, to avoid a power waste caused by maintaining the eSIM card powered on, the eSIM card is powered off, to reduce power consumption of the eSIM card and reduce power consumption of the UE.

According to a second aspect, this application provides an embedded subscriber identity module eSIM card identification method applicable to a terminal device, including:
after the terminal device completes an initialization process in response to a startup command triggered by a user, driving an eSIM card to be powered on;
sending a first indication to the eSIM card, where the first indication is used to query whether the eSIM card is activated or whether an activated profile exists in the eSIM card; and
obtaining first feedback information sent by the eSIM card, where the first feedback information includes an eSIM card activation indicator; and powering off the eSIM card when the eSIM card activation indicator indicates that the eSIM card is not activated or no activated profile exists in the eSIM card.

In the foregoing solution, in an application scenario in which the UE is started or restarted, after the eSIM card is powered on, a profile corresponding to the eSIM card is not downloaded or activated because the eSIM card is not activated. In this case, to avoid a power waste caused by maintaining the eSIM card powered on, the eSIM card is powered off, to reduce power consumption of the eSIM card and reduce power consumption of the UE.

In a possible design, the initialization process includes an initialization process of a modem and an initialization process of a processor. In this design, the processor and the modem may synchronously perform an initialization process.

In a possible design, the first indication is issuer security domain root ISD-R selection request information, and the first feedback information is ISD-R response information. In this design, an ISD-R selection request may be used obtain the eSIM card activation indicator.

In a possible design, after the obtaining first feedback information sent by the eSIM card, the method further includes: maintaining the eSIM card in a power-on state when the eSIM card activation indicator indicates that an activated profile exists in the eSIM card. In this design, when the profile corresponding to the eSIM card is activated, the eSIM card is maintained in the power-on state, so that the user uses a related function of the eSIM card.

In a possible design, before the driving an eSIM card to be powered on or the sending a first indication to the eSIM card, the method further includes: obtaining an LPA activation flag bit, where the LPA activation flag bit indicates whether a local profile assistant LPA is activated; and when the LPA activation flag bit indicates that the LPA is activated, maintaining the eSIM card in the power-on state. In this design, the LPA activation flag bit can be used to determine whether the LPA is activated. The LPA being activated indicates that the user may need to operate the eSIM card, and the eSIM card is maintained in the power-on state.

In a possible design, after the obtaining an LPA activation flag bit, the method further includes: when the LPA activation flag bit indicates that the LPA is not activated, sending the first indication to the eSIM card. In this design, if the LPA is not activated, it indicates that the user does not need to operate the eSIM card. The terminal device needs to obtain the eSIM card activation indicator to determine whether an activated profile exists in the eSIM card. When no activated profile exists, the eSIM card is powered off to reduce power consumption.

In a possible design, before the obtaining an LPA activation flag bit, the method further includes: obtaining a first setting request, where the first setting request is triggered when the user enables the LPA, and the first setting request indicates the modem to set the LPA flag bit to activated; and setting the LPA activation flag bit to activated in response to the first setting request. In this design, when it is detected that the user enables the LPA, the LPA activation flag bit is set to activated.

In a possible design, after the setting the LPA activation flag bit to activated, the method further includes: obtaining a second setting request, where the second setting request is triggered by disabling the LPA by the user when the eSIM card is in the power-on state, and the second setting request indicates the modem to set the LPA flag bit to inactivated; and setting the LPA activation flag bit to inactivated in response to the second setting request. In this design, when it is detected that the user disables the LPA, the LPA activation flag bit is set to inactivated.

In a possible design, after the setting the LPA activation flag bit to activated, and before the obtaining an LPA activation flag bit, the method further includes: obtaining a power-on request, where the power-on request is triggered by the LPA when the eSIM card is not powered on; and in response to the power-on request, driving the eSIM card to be powered on. In this design, when the LPA is in an active state, the user may need to operate the eSIM card. If the eSIM card is not powered on, the eSIM card needs to be powered on, so that the user can operate the eSIM card.

In a possible design, the ISD-R response information includes the following three fields: lpaeUsingCatSupported (0), lpaeUsingScwsSupported (1), and enabledProfile (2); lpaeUsingCatSupported (0) indicates whether an embedded universal integrated circuit card eUICC supports a card application toolkit; lpaeUsingScwsSupported (1) indicates whether the eUICC supports a smart card web server; and enabledProfile (2) indicates whether the eUICC includes an activated profile.

In a possible design, powering on or powering off the eSIM card is controlled by the modem of the terminal device.

In a possible design, the method may further include: obtaining an LPA activation flag bit; powering off the eSIM card when the LPA activation flag bit indicates that an LPA is not activated, and the eSIM card activation indicator indicates that the eSIM card is not activated or no activated profile exists in the eSIM card; and maintaining the eSIM card in a power-on state when the LPA activation flag bit indicates that the LPA is activated, or the eSIM card activation indicator indicates that an activated profile exists in the eSIM card. In this design, when the LPA is not activated and no activated profile exists in the eSIM card, the eSIM card is powered off, to reduce power consumption.

According to a third aspect, this application provides an eSIM card identification apparatus, including:
  a power-on control unit, configured to: after the terminal device completes an initialization process, drive an eSIM card to be powered on;
  a sending unit, configured to send a first indication to the eSIM card, where the first indication is used to query whether the eSIM card is activated or whether an activated profile exists in the eSIM card;
  a feedback information obtaining unit, configured to obtain first feedback information sent by the eSIM card, where the first feedback information includes an eSIM card activation indicator; and
  a power-off control unit, configured to power off the eSIM card when the eSIM card activation indicator indicates that the eSIM card is not activated or no activated profile exists in the eSIM card.

In a possible design, the initialization process includes an initialization process of a modem and an initialization process of a processor.

In a possible design, the first indication is issuer security domain root ISD-R selection request information, and the first feedback information is ISD-R response information.

In a possible design, after obtaining the first feedback information sent by the eSIM card, the power-on control unit is further configured to: maintain the eSIM card in a power-on state when the eSIM card activation indicator indicates that an activated profile exists in the eSIM card.

In a possible design, the apparatus further includes an LPA obtaining unit, configured to obtain an LPA activation flag bit before the power-on control unit drives the eSIM card to be powered on or before the sending unit sends the first indication to the eSIM card, where the LPA activation flag bit indicates whether a local profile assistant LPA is activated; and
  the power-on control unit is further configured to: when the LPA activation flag bit indicates that the LPA is activated, maintain the eSIM card in the power-on state.

In a possible design, the sending unit is further configured to: after the LPA obtaining unit obtains the LPA activation flag bit, when the LPA activation flag bit indicates that the LPA is not activated, send the first indication to the eSIM card.

In a possible design, the apparatus further includes:
  a setting request obtaining unit, configured to obtain a first setting request before the LPA obtaining unit obtains the LPA activation flag bit, where the first setting request is triggered when a user enables the LPA, and the first setting request indicates the modem to set the LPA flag bit to activated; and
  a setting unit, configured to set the LPA activation flag bit to activated in response to the first setting request.

In a possible design, the setting request obtaining unit is further configured to obtain a second setting request after the setting unit sets the LPA activation flag bit to activated, where the second setting request is triggered by disabling the LPA by the user when the eSIM card is in the power-on state, and the second setting request indicates the modem to set the LPA flag bit to inactivated;
  the setting unit is further configured to set the LPA activation flag bit to inactivated in response to the second setting request.

In a possible design, the power-on control unit is further configured to:
  after the setting unit sets the LPA activation flag bit to activated, and before the LPA obtaining unit obtains the LPA activation flag bit, obtain a power-on request, where the power-on request is triggered by the LPA when the eSIM card is not powered on; and in response to the power-on request, drive the eSIM card to be powered on.

In a possible design, the ISD-R response information includes the following three fields: lpaeUsingCatSupported (0), lpaeUsingScwsSupported (1), and enabledProfile (2); and
  lpaeUsingCatSupported (0) indicates whether an embedded universal integrated circuit card eUICC supports a card application toolkit; lpaeUsingScwsSupported (1) indicates whether the eUICC supports a smart card web server; and enabledProfile (2) indicates whether the eUICC includes an activated profile.

In a possible design, powering on or powering off the eSIM card is controlled by the modem of the terminal device.

In a possible design, the apparatus further includes:
an activation flag bit obtaining unit, configured to obtain an LPA activation flag bit.

The power-off control unit is further configured to power off the eSIM card when the LPA activation flag bit indicates that an LPA is not activated, and the eSIM card activation indicator indicates that the eSIM card is not activated or no activated profile exists in the eSIM card.

The power-on control unit is further configured to maintain the eSIM card in a power-on state when the LPA activation flag bit indicates that an LPA is activated, or the eSIM card activation indicator indicates that an activated profile exists in the eSIM card.

A beneficial effect of each possible design in the third aspect is the same as a beneficial effect of a corresponding design in the second aspect, and details are not described herein again.

According to a fourth aspect, this application provides a computer program product including instructions. When the computer program product is run on a terminal device, the terminal device is enabled to perform the method in any possible design of the second aspect.

According to a fifth aspect, this application provides a computer-readable storage medium including instructions, and when the instructions are run on a terminal device, the terminal device is enabled to perform the method in any possible design of the second aspect.

According to a sixth aspect, this application provides a chip, including at least one processor, a modem, and one or more computer programs. The one or more programs are stored in the modem, and the one or more computer programs include instructions. When the instructions are executed by the chip, the modem is enabled to perform the following steps: after an initialization process is completed, driving an eSIM card to be powered on; sending a first indication to the eSIM card, where the first indication is used to query whether the eSIM card is activated or whether an activated profile exists in the eSIM card; obtaining first feedback information sent by the eSIM card, where the first feedback information includes an eSIM card activation indicator; and powering off the eSIM card when the eSIM card activation indicator indicates that the eSIM card is not activated or no activated profile exists in the eSIM card.

A beneficial effect of the sixth aspect is the same as a beneficial effect of the second aspect, and details are not described herein again.

In a possible design, the first indication is issuer security domain root ISD-R selection request information, and the first feedback information is ISD-R response information.

In a possible design, after obtaining the first feedback information sent by the eSIM card, the chip further performs the following step: maintaining the eSIM card in a power-on state when the eSIM card activation indicator indicates that an activated profile exists in the eSIM card.

In a possible design, before driving the eSIM card to be powered on or sending the first indication to the eSIM card, the chip further performs the following steps: obtaining an LPA activation flag bit, where the LPA activation flag bit indicates whether a local profile assistant LPA is activated; and when the LPA activation flag bit indicates that the LPA is activated, maintaining the eSIM card in the power-on state.

In a possible design, after obtaining the LPA activation flag bit, the chip further performs the following step: when the LPA activation flag bit indicates that the LPA is not activated, sending the first indication to the eSIM card.

In a possible design, before obtaining the LPA activation flag bit, the chip further performs the following steps: obtaining a first setting request, where the first setting request is triggered when a user enables the LPA, and the first setting request indicates the modem to set the LPA flag bit to activated; and setting the LPA activation flag bit to activated in response to the first setting request.

In a possible design, after setting the LPA activation flag bit to activated, the chip further performs the following steps: obtaining a second setting request, where the second setting request is triggered by disabling the LPA by the user when the eSIM card is in the power-on state, and the second setting request indicates the modem to set the LPA flag bit to inactivated; and setting the LPA activation flag bit to inactivated in response to the second setting request.

In a possible design, after setting the LPA activation flag bit to activated, and before obtaining the LPA activation flag bit, the chip further performs the following steps: obtaining a power-on request, where the power-on request is triggered by the LPA when the eSIM card is not powered on; and in response to the power-on request, driving the eSIM card to be powered on.

In a possible design, the ISD-R response information includes the following three fields: lpaeUsingCatSupported (0), lpaeUsingScwsSupported (1), and enabledProfile (2); and
lpaeUsingCatSupported (0) indicates whether an embedded universal integrated circuit card eUICC supports a card application toolkit; lpaeUsingScwsSupported (1) indicates whether the eUICC supports a smart card web server; and enabledProfile (2) indicates whether the eUICC includes an activated profile.

In a possible design, the chip further performs the following steps: obtaining an LPA activation flag bit; powering off the eSIM card when the LPA activation flag bit indicates that an LPA is not activated, and the eSIM card activation indicator indicates that the eSIM card is not activated or no activated profile exists in the eSIM card; and maintaining the eSIM card in a power-on state when the LPA activation flag bit indicates that an LPA is activated, or the eSIM card activation indicator indicates that an activated profile exists in the eSIM card.

It should be noted that the embodiments of the present invention may be randomly combined to achieve different technical effects.

According to the foregoing solution, after the UE powers on the eSIM card, the profile corresponding to the eSIM card is not downloaded or activated because the eSIM card is not activated. In this case, to avoid a power waste caused by maintaining the eSIM card powered on, the eSIM card is powered off, to reduce power consumption of the eSIM card and reduce power consumption of the modem on the UE, and further reduce overall power consumption of the UE.

BRIEF DESCRIPTION OF THE DRAWINGS

To describe the technical solutions in embodiments of this application more clearly, the following briefly describes the accompanying drawings required to describe embodiments or the conventional technology.

DETAILED DESCRIPTION OF ILLUSTRATIVE EMBODIMENTS

Figure 1:
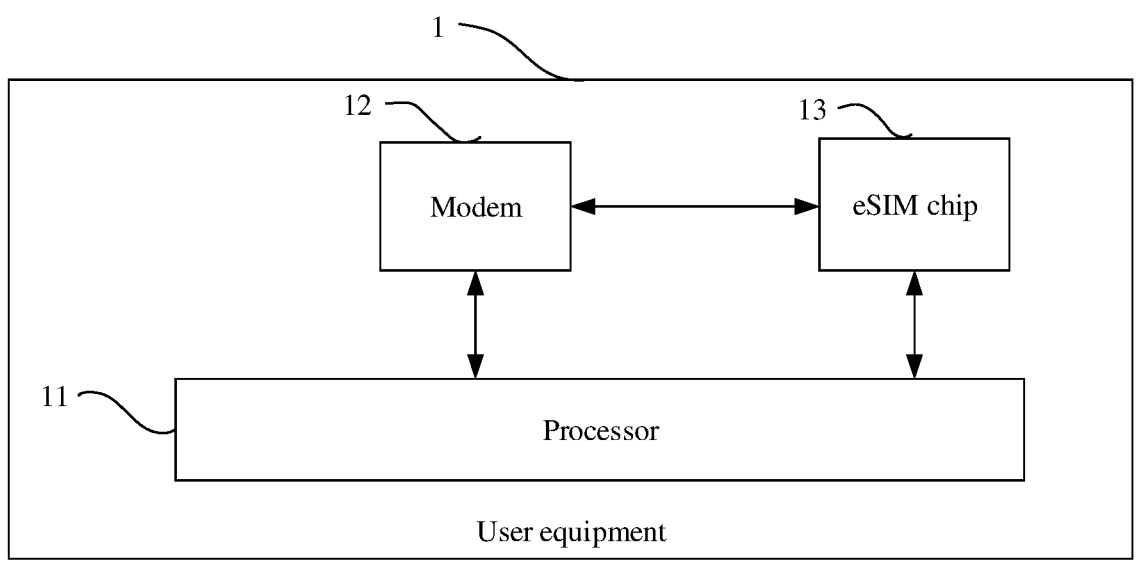
FIG. 1 is a schematic diagram of a structure of user equipment to which an eSIM card identification method is applicable according to an embodiment of this application.

The following describes the acronyms and terms used in this application.

eSIM: Embedded subscriber identity module, embedded SIM card. The eSIM described in this application means that a conventional SIM card is directly embedded into a mobile device chip instead of being added as an independent removable component of the device. A user does not need to insert a physical SIM card such as a universal subscriber identity module USIM: universal subscriber identity module. The eSIM card application solution is to change a conventional SIM card to an embedded chip that is embedded in a terminal device, and is no longer a plug-in type. The eSIM card has functions of networking and remote card writing. The eSIM card writes and modifies data such as a subscriber network access number through a network management platform, so that a phone number can be changed without changing a phone or a phone can be changed without changing a phone number. In some embodiments, the eSIM card in this application may be extended to another programmable SIM card, such as a softSIM or a vSIM. In some embodiments, the eSIM card may also be referred to as an eSIM card, an eSIM chip, or an embedded SIM. eUICC: embedded UICC, embedded universal integrated circuit card.

ISD-R: issuer security domain root, issuer security domain root.

APDU: application protocol data unit. The application protocol data unit includes control information and data at an application layer.

LPA: local profile assistant. The LPA is a core module of an eUICC to manage a profile, mainly includes three parts: LPD, an LDS, and an LUI, and may be located in LPAd of UE, or may be located in LPAe of an eSIM. In some embodiments, the LPA may exist in a form of an Android package (AndroidPackage, APK) in a modem, or may exist in a form of an application (Application, App) at an application layer.

LPD: local profile download. The local profile download is located in the LPA. The LPD is responsible for download of a profile data packet and transparent transmission of a command in a download process.

LDS: local discovery services. The local discovery service is located in the LPA.

LUI: local user interface. The local user interface is located in the LPA, and is configured to parse an operation instruction of a user, and send a profile control instruction to an eSIM card.

ATR: answer to reset, answer to reset. The ATR includes one initial character TS and a maximum of 32 additional characters. These characters together provide information about how a terminal subsequently communicates with a card.

NVM: non-volatile memory, non-volatile memory.

OTA: over the air. The over the air is a technology in which SIM card data and applications are remotely managed through an air interface for mobile communication.

Profile: or referred to as a "configuration file". The profile in this application is a set of various data and applications that are used in an eUICC, to provide various services, such as a voice service or a data service. According to some embodiments, the profile is contracted or subscribed by a user to a related mobile operator to provide a network service for the user. According to some embodiments, the profile may include system files such as an MF, an EF, a DF, applications such as a network access application NAA, a security domain security domain, and another non-communications service, profile metadata such as profile policy rules profile policy rules, and a mobile network operator-security domain mobile network operator-SD such as an OTA providing service.

Mobile network operator: also referred to as "operator", "mobile network operator", "mobile operator", "network operator", and the like. In this application, the MNO is a party that subscribes with a user to provide network service access. According to some embodiments, the MNO may also be an issuer that controls programming of the eUICC, and is also referred to as a "card issuer".

ICCID: ID of an integrated circuit card, which is used to identify a unique number of an eSIM.

ISD P-AID: issuer security domain profile-application identification, which may be understood as an identity of a profile.

Modem: The modem is a communications module used for a terminal device. In some embodiments, the modem delivers an instruction (usually a standard AT instruction) through an upper-layer processing system, to transmit data to a wireless network. In some embodiments, network standards (GSM, CDMA, WCDMA, TD-SCDMA, and the like) supported by the terminal device are all determined by the modem. In some embodiments, the modem in the terminal device may also be understood as a baseband chip in the terminal device. In some implementations, the modem may also be understood as control software corresponding to a baseband chip in the terminal device, for example, a modem protocol stack. In some embodiments, the modem in this application may be implemented on a chip in physical, for example, is integrated on a baseband chip or a baseband processor, or may be implemented in software by using an operating system or an eSIM management module.

User equipment UE: The terms "wireless communication device," "wireless device," "mobile device," "terminal device," and "user terminal" are used interchangeably in this specification, to describe one or more general-purpose consumer electronic devices that can perform a processes associated with embodiments of the present disclosure. According to various specific implementations, any one of these consumer electronic devices relates to a cellular phone or smartphone, a tablet computer, a laptop computer, a personal computer, a netbook computer, a media player device, an electronic book device, a MiFi device, a wearable device, and any other type of electronic computing device having a wireless communications capability. The wireless communications capability may include communication by using one or more wireless communication protocols used for communication on the following networks: a wireless wide area network (WWAN), a wireless metropolitan area network (WMAN), a wireless local area network (WLAN), a wireless personal area network (WPAN), near field communication (NFC), a cellular wireless network, fourth generation (4G) LTE, LTE-advanced (LTE-A), and/or 5G or other existing or future advanced cellular wireless networks.

In the following description, to illustrate rather than limit, specific details such as a particular system structure and a technology are provided, to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that when used in the specification and the claims, the term "including" indicates presence of the described features, entireties, steps, operations, elements and/or components, but does not exclude presence or addition of one or more other features, entireties, steps, operations, elements, components, and/or collections thereof.

It should be further understood that the term "and/or" used in the specification and claims of this application indicates any combination and all possible combinations of one or more items listed in association, and includes the combinations.

As used in the specification and claims of this application, the term "if" may be interpreted as "when", "once", "in response to determining", or "in response to detecting" depending on the context. Similarly, the phrase "if it is determined" or "if the [described condition or event] is detected" may be interpreted as meaning "once determined", "in response to determining", "once the [described condition or event] is detected", or "in response to detecting the [described condition or event]" depending on the context.

In addition, in the description of the specification and claims of this application, the terms "first", "second", "third", and the like are merely intended for a purpose of differentiated description, but shall not be understood as an indication or an implication of relative importance.

Referring to "an embodiment", "some embodiments", or the like in the specification of this application means that one or more embodiments of this application include a specific feature, structure, or characteristic described with reference to the embodiment. Therefore, in this specification, statements such as "in an embodiment", "in some embodiments", "in some other embodiments", "in some other embodiments", and "in other embodiments" that appear at different places do not necessarily mean a same embodiment, but mean "one or more but not all of the embodiments", unless otherwise specified. The terms "include", "contain", "have", and their variations all mean "include but not be limited to", unless otherwise specified.

Before the technical solutions in embodiments of this application are described in detail, an eSIM card control method in a related technology is first briefly described.

Currently, UE with pre-installed eSIM card maintains the eSIM in a power-on state after startup. However, when the eSIM is not enabled or activated, a user cannot use a related function and service of the eSIM, and the UE does not need to power on the eSIM. In the conventional technology, when the eSIM card is not enabled or is not activated, maintaining the eSIM card in the power-on state increases power consumption of the UE, and consequently increases overall power consumption of the UE.

In a related technology, an eSIM card control method is provided. When the eSIM card in the UE does not need to be accessed for a long time, the UE may send a suspend instruction to the eSIM card, such as suspend eSIM. When receiving the suspend instruction, the eSIM card stores related data of an eSIM card state in an NVM of the eSIM card, and enters a suspend mode. The UE turns off a power supply that supplies power to the eSIM card. The eSIM card state includes but is not limited to a card recognition state and a card lock state. The eSIM is mainly used to store information such as user information, an authentication key, an SMS message, and a payment method.

When the eSIM card is suspended, the data related to the eSIM card state is stored in the NVM. Therefore, when the eSIM card needs to be accessed, the eSIM card may be restored to the eSIM card state before a power failure based on the stored data related to the eSIM card state.

However, when the eSIM card does not support a suspend mechanism, the UE cannot control the eSIM card to enter the suspend mode. When the eSIM card does not need to be accessed, the eSIM card is still in the power-on state, and power consumption of the UE cannot be reduced. In addition, before the eSIM card is suspended, the NVM needs to be used to store the data related to the eSIM card state. This increases memory overheads.

To resolve a technical problem that power consumption of the UE increases to maintain the eSIM card in the power-on state when the eSIM card is not enabled or is not activated, this application provides an eSIM card identification method. When the eSIM card is not activated or a profile corresponding to the eSIM card is not activated, the UE powers off the eSIM card. When an LPA is in an active state, the UE powers on the eSIM card. In embodiments of this application, when the LPA is in an inactive state and the profile corresponding to the eSIM card is not activated, it indicates that a user does not need to use a related function of the eSIM card, and the UE powers off the eSIM card, to reduce power consumption of the eSIM card, reduce standby power consumption of the UE, and increase a battery life.

FIG. 1 is a schematic diagram of a partial structure of user equipment to which an eSIM card identification method is applicable according to an embodiment of this application.

User equipment 1 in embodiments of this application may include a mobile phone, a tablet computer, a personal digital assistant (Personal Digital Assistant, PDA), a point of sales (Point of Sales, POS), a vehicle-mounted computer, a TV, a wearable device, an AR device, a VR device, and the like. The user equipment 1 in this application may include a processor 11, a modem 12, and an eSIM chip 13. A person skilled in the art may understand that the structure of the user equipment UE shown in FIG. 1 does not constitute a limitation on the UE, and may include more or fewer components than those shown in the figure, or some components may be combined, or some components may be divided, or there may be different component arrangements.

The following specifically describes the components of the user equipment 1 shown in FIG. 1.

The processor 11 may include one or more processors, configured to receive a startup command, and perform an initialization process in response to the startup command. For example, the processor 11 may include an application processor (application processor, AP), a graphics processing unit (graphics processing unit, GPU), an image signal processor (image signal processor, ISP), a controller, a video codec, a digital signal processor (digital signal processor, DSP), and/or a neural-network processing unit (neural-network processing unit, NPU).

The modem 12 is configured to power on an eSIM card during startup, and is configured to: when it is determined that an LPA is activated, maintain the eSIM card in a power-on state; when it is determined that the LPA is not activated, determine whether a profile of the eSIM card is activated; when it is determined that the profile is activated, maintain the eSIM card in the power-on state; and when it is determined that the profile is not activated, power off the eSIM card.

The eSIM chip 13, also referred to as an eSIM card or an embedded SIM, is configured to download or store a profile. In some embodiments, the UE may be configured with one eSIM chip. In some embodiments, a plurality of profiles may be supported and activated in the eSIM chip, for example, a maximum quantity of supported profiles may be determined by a card issuer or an operator.

An operating system of the UE may be an Android system, an iOS system, or a Windows system. The following describes a block diagram of a software structure of the UE by using an example in which the operating system of the UE is the Android system. In some embodiments, the Android system is divided into five layers: an application layer, an application framework (framework, FWK) layer, a hardware abstraction layer, a Linux kernel layer, and a driver modem layer. The layers communicate with each other through a software interface.

Figure 2:
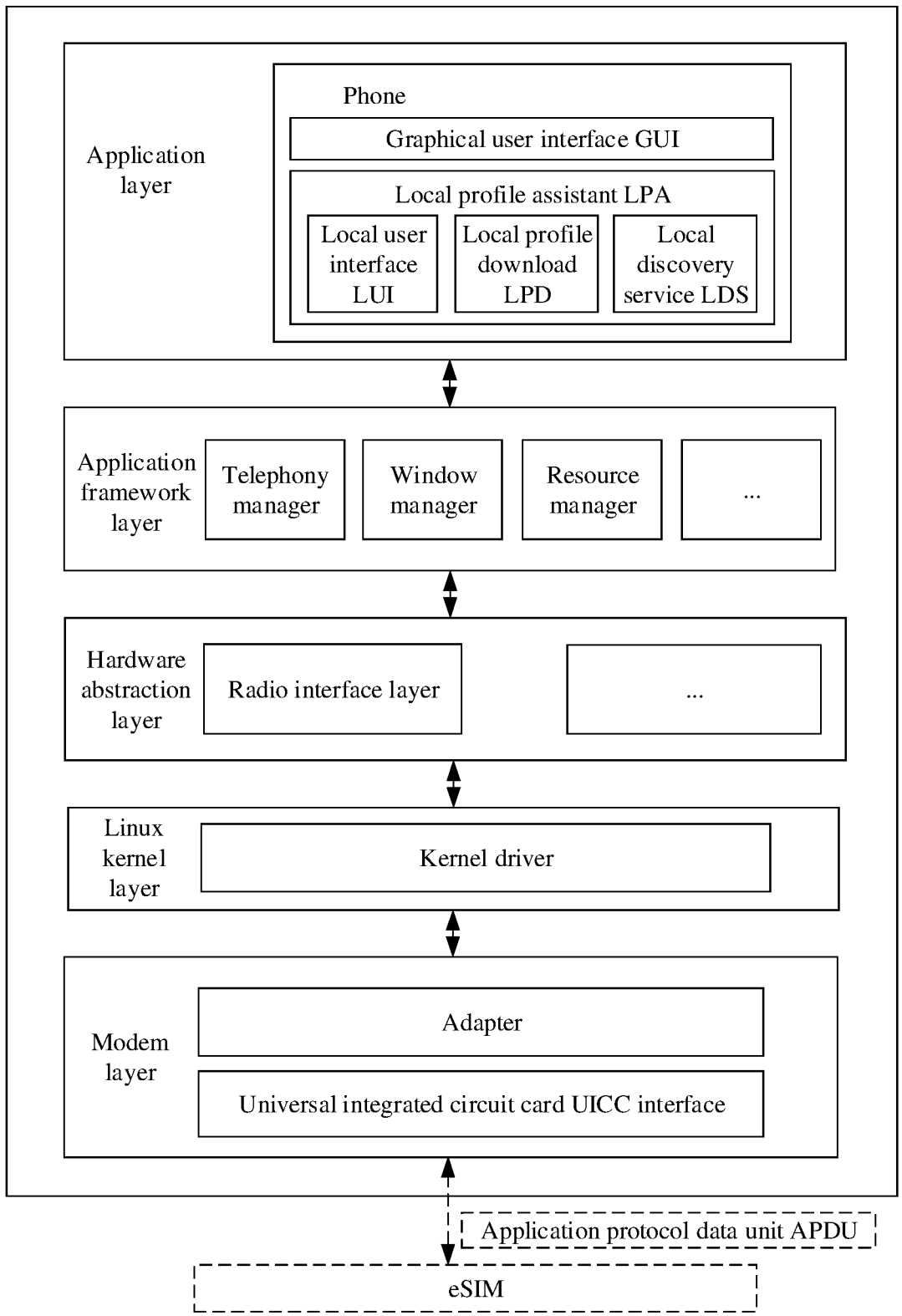
FIG. 2 is a schematic diagram of a software architecture of user equipment according to an embodiment of this application.

FIG. 2 is a schematic diagram of a software architecture of the user equipment 1 according to an embodiment of this application. As shown in FIG. 2, the application layer may include a series of application packages, and the application packages may include applications such as Messages, Calendar, Camera, Video, Navigation, Gallery, and Phone. For example, the Phone application may include a graphical user interface (Graphical User Interface, GUI) and an LPA.

The application framework layer provides an application programming interface (application programming interface, API) and a programming framework for an application at the application layer. The application framework layer may include some predefined functions, for example, a function for receiving an event sent by the application framework layer.

As shown in FIG. 2, the application framework layer may include a telephony manager (TelephonyManager), a window manager, a resource manager, and the like.

The telephony manager is configured to manage a communications function and a call status of UE, obtain telephone information (device information, eSIM card information, and network information), monitor a telephone status (a call status, a service status, a signal strength status, and the like), and can invoke a telephone dialer to make a call.

The window manager is configured to manage a window program. The window manager may obtain a size of a display, determine whether there is a status bar, perform screen locking, take a screenshot, and the like. The content provider is configured to store and obtain data and enable the data to be accessed by an application. The data may include a video, an image, audio, calls that are made and received, a browsing history and a bookmark, a phone book, and the like.

The resource manager provides various resources for an application, such as a localized character string, an icon, a picture, a layout file, and a video file.

The hardware abstraction layer is a layer between hardware and software. The hardware abstraction layer may include a radio interface layer, a display driver, a camera driver, and a sensor driver, and is configured to drive related hardware at the hardware layer, such as a display, a camera, and a sensor.

The Linux kernel layer includes a kernel driver, and the Linux kernel is configured to provide a core system service of Android. Security, memory management, process management, a network protocol stack, and a driver model of the Android system are all based on the Linux kernel. The Linux kernel is also used as an abstract layer between the hardware and a software stack.

The modem layer includes an adapter (Adapter), a universal integrated circuit card UICC interface, and a card driver module. The modem layer is configured to interact with the eUICC. For example, the modem layer interacts with an eSIM card by using an APDU.

To make the objectives, technical solutions, and advantages of this application clearer, the following further describes in detail a specific implementation of an eSIM card control method in this application with reference to the accompanying drawings.

Figure 3:
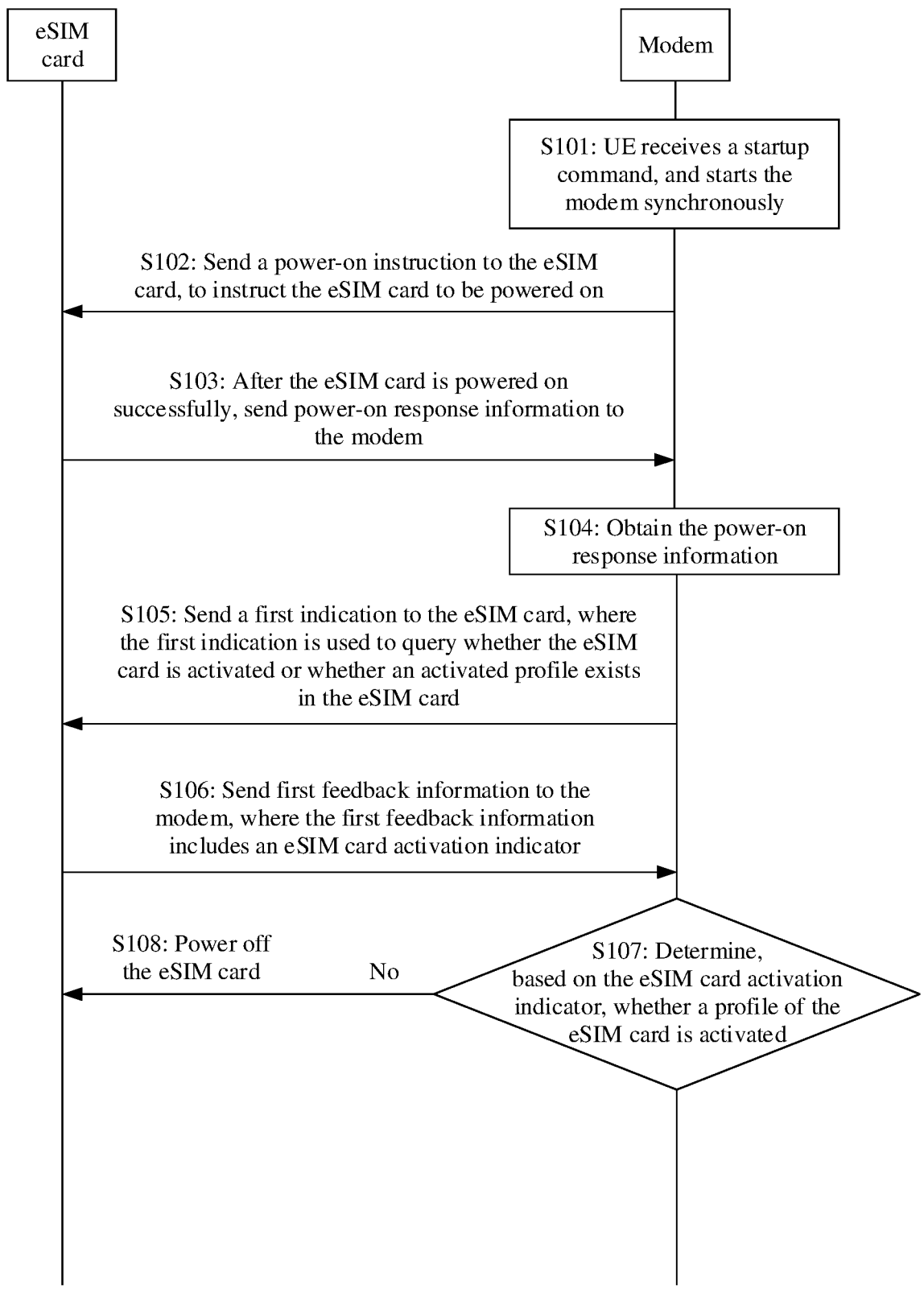
FIG. 3 is a schematic diagram of an application scenario for identifying an eSIM card according to a first embodiment of this application.

FIG. 3 is a schematic diagram of an application scenario for identifying an eSIM card according to a first embodiment of this application. This embodiment is performed by UE that is configured with an eSIM card and a modem. The application scenario in this embodiment is that the UE is started for the first time, and the eSIM card in the UE is not activated. In this embodiment, an eSIM card identification method includes the following steps.

S101: The UE receives a startup command, and starts the modem synchronously.

A user triggers the startup command by using a power button on the UE. When obtaining the startup command triggered by the user, the UE starts a startup process in response to the startup command triggered by the user. The UE starts the modem synchronously in the startup process. The modem may drive the eSIM card to be powered on, and control the eSIM card to work.

In a possible embodiment, an AP of the UE receives the startup command and enters a startup initialization process, and the modem synchronously performs an initialization process.

In another possible embodiment, after receiving the startup command, an AP of the UE enters a startup initialization process, and the modem synchronously performs an initialization process.

S102: The modem sends a power-on instruction to the eSIM card in the UE, to instruct the eSIM card to be powered on.

For example, the user triggers the startup command by using the power button on the UE. When obtaining the startup command triggered by the user, the UE starts the startup process. In the startup process of the UE, the modem is started synchronously. When the modem is started, the modem may send the power-on instruction to the eSIM card to drive the eSIM card to be powered on, so that the eSIM card is in a power-on state.

In some embodiments, when being initialized, the modem may also send the power-on instruction to the eSIM card, to drive the eSIM card to be powered on.

S103: After being powered on successfully, the eSIM card sends power-on response information to the modem.

When receiving the power-on instruction sent by the modem, the eSIM card in the UE switches to the power-on state. Then, the eSIM card returns the power-on response information to the modem to notify the modem that the eSIM card is powered on successfully.

For example, when the eSIM card in the UE receives a reset (Reset) command sent by the modem, the eSIM card responds to the reset command, and the eSIM card is powered on. Then, the eSIM card sends an ATR instruction to the modem, to notify the modem that the eSIM card is powered on successfully.

S104: The modem obtains the power-on response information.

S105: The modem sends a first indication to the eSIM card, where the first indication is used to query whether the eSIM card is activated or whether an activated profile exists in the eSIM card.

Specifically, the UE sends issuer security domain root ISD-R selection request information to the eSIM card. The ISD-R selection request information is used to obtain an eSIM card activation indicator, and the eSIM card activation indicator is used to query whether the eSIM card is activated or the file profile corresponding to the eSIM card is activated. When an activated eSIM card or an activated profile exists, the UE queries a quantity of activated eSIM cards or profiles.

The modem obtains the power-on response information returned by the eSIM card. Then, the modem may send the ISD-R selection request information to the eSIM card by using an APDU instruction, to query whether a profile exists in the eSIM card. When the profile exists in the eSIM card, the modem queries whether an activated profile exists in the eSIM card. When the activated profile exists, the modem may further query the activated profile. When a profile exists in the eSIM card, it indicates that the eSIM card is activated.

In this embodiment, an ISD-R selection request is used to obtain an eSIM card activation indicator, instead of another related command for interaction between the modem and the eSIM card.

In a possible implementation, the modem of the UE may also obtain the eSIM card activation indicator from the eSIM card through a data access interface that is configured to obtain profile information. For example, the APDU instruction including an ESioc.GetProfilesInfo command is sent to the eSIM card through a GetProfilesInfo interface, so that the eSIM card returns the eSIM card activation indicator.

S106: The eSIM card sends first feedback information to the modem, where the first feedback information includes the eSIM card activation indicator.

The eSIM card activation indicator may indicate whether an activated eSIM card exists, or indicate a quantity of activated eSIM cards, or indicate a quantity of activated profiles.

The profile may be downloaded to the eSIM card through an OTA service. In some embodiments, one eSIM card may download or store a plurality of profiles, and the profiles may correspond to different communications operator networks, or may correspond to a same communications operator network. This is not limited herein. For example, the plurality of profiles may be subscribed to different MMOs or a same MMO. That is, a plurality of phone numbers of the plurality of MMOs may be provided for the user to select. Each profile has a file structure and an application of the profile, and has a unique identity ID. Each application also has an identity of the application, and an identity of an application in one profile is unique.

One profile may correspond to one MNO phone number. In some embodiments, a corresponding profile may be activated based on a phone number selected by the user. In some embodiments, the user may select a plurality of phone numbers, and accordingly, corresponding plurality of profiles may be activated. It should be noted that the selection herein may be understood as first activation, re-activation, configuration of various data access environments, data read, or the like.

Figure 4:
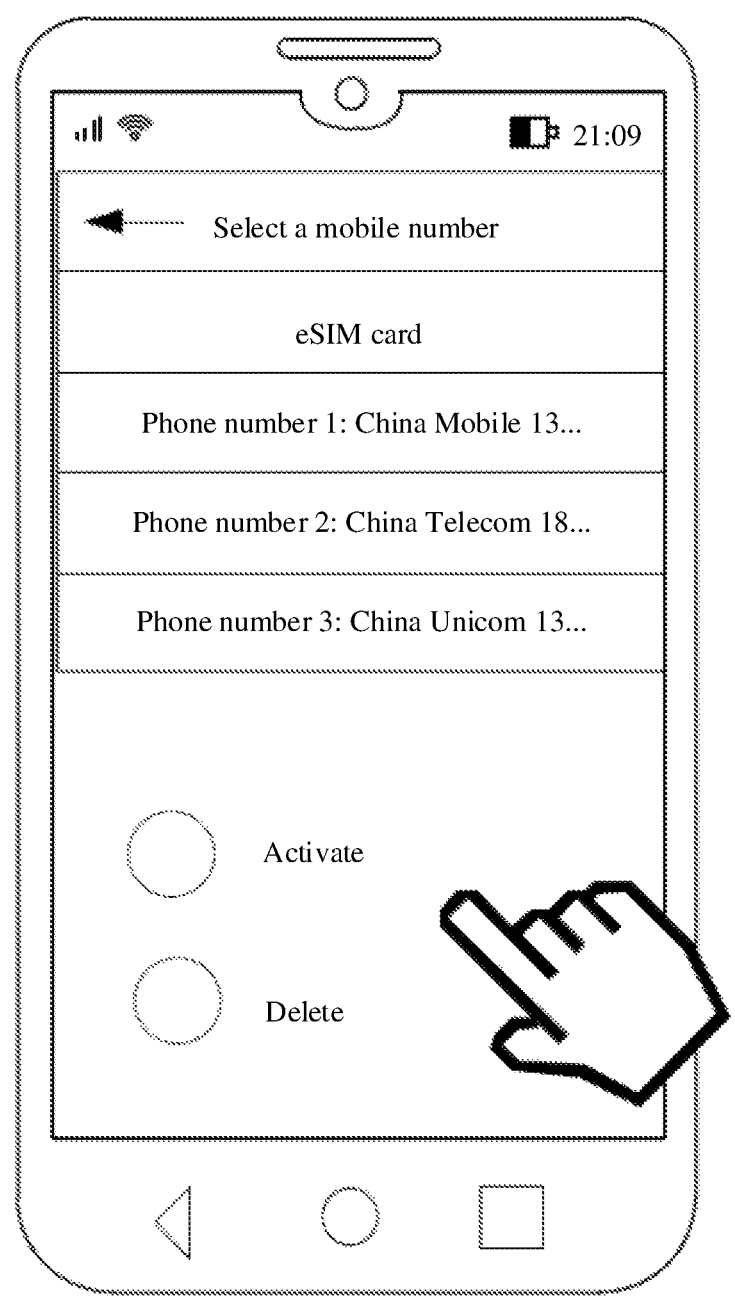
FIG. 4 is a diagram of a user interface according to an embodiment of this application.

For example, the user may activate or deactivate any profile in the eSIM card by using a user interface (User Interface, UI) shown in FIG. 4. For example, when the UE detects that the user selects a phone number 1 and selects an "Activate" option, it indicates that the user wants to use the phone number 1, and the UE may activate a profile corresponding to the phone number 1. After the user selects the phone number 1, if the UE detects that the user selects a phone number 2 and selects the "Activate" option, it indicates that the user wants to switch a mobile number. The UE may activate a profile corresponding to the phone number 2, and deactivate the profile corresponding to the phone number 1. When the UE detects that the user selects the phone number 1 and selects a "Delete" option, it indicates that the user wants to cancel the phone number 1. The UE may delete the profile of the phone number 1 in the eSIM, or may delete the phone number 1 from a phone number list shown in FIG. 4.

It should be noted that when the user downloads the profile to the eSIM card, the UE may automatically obtain profile list information in the eSIM card, may display the profile list information as mobile number information, and generate the eSIM card activation indicator based on the profile list information. In some embodiments, the UE may also read an existing profile list and an activation state in the eSIM card, and may generate the eSIM card activation indicator based on the read profile list.

Specifically, S106 may be as follows: The eSIM card of the UE may send ISD-R response information to the modem, where the ISD-R response information includes the eSIM card activation indicator.

In response to the ISD-R selection request information, the eSIM card of the UE generates the ISD-R response information based on the eSIM card activation indicator, and sends the ISD-R response information to the modem.

The ISD-R response information may include three fields: lpaeUsingCatSupported (0), lpaeUsingScwsSupported (1), and enabledProfile (2).

LpaeUsingCatSupported (0) indicates whether an eUICC supports a card application toolkit card application toolkit. 0 may indicate that the eUICC supports a card application toolkit, and 1 indicates that the eUICC does not support a card application toolkit.

LpaeUsingScwsSupported (1) indicates whether the eUICC supports a smart card web server.

EnabledProfile (2) indicates whether the eUICC includes an activated profile. That is, enabledProfile (2) is used to write an eSIM card activation indicator. 0 may indicate that the eUICC does not include an activated profile, and 1 may indicate that the eUICC includes an activated profile. In some embodiments, when a quantity of activated profiles in the eUICC is greater than or equal to 2, the quantity of activated profiles included in the eUICC may also be represented by a corresponding value. For example, when a quantity of activated profiles in the eUICC is 3, the eSIM card activation indicator may be 3.

The eSIM card activation indicator may be directly obtained by the eSIM card, or may be generated based on a detection result after the eSIM card detects whether the profile in the eSIM card is activated. This is not limited herein.

For example, the eSIM card stores the eSIM card activation indicator. The eSIM card in the UE obtains the eSIM card activation indicator from the eSIM card in response to the ISD-R selection request information sent by the modem.

It may be understood that when the user downloads a profile, or activates or deactivates a profile by using the user interface shown in FIG. 4, the eSIM card may modify, based on a user operation, a value of the eSIM card activation indicator stored in the eSIM card. For example, when the UE is delivered from the factory or the UE is started for the first time, the eSIM card activation indicator may be set to 0. Then, when it is detected that the user downloads and activates any profile, the value of the eSIM card activation indicator is changed from 0 to 1. When the user deletes the activated profile and no other profile is in an active state, the eSIM card changes the value of the eSIM card activation indicator from 1 to 0. After activating the profile, when the user resets the eSIM card to delete all profiles in the eSIM card, the eSIM card changes the value of the eSIM card activation indicator from 1 to 0.

For another example, in response to the ISD-R selection request information sent by the modem, the eSIM card in the UE queries whether the profile in the eSIM card is activated, and generates the eSIM card activation indicator based on the query result.

A step of detecting whether the profile in the eSIM card is activated by the eSIM card includes: The eSIM card detects whether the profile corresponding to the eSIM card exists in the eSIM card. If the profile corresponding to the eSIM card exists, the eSIM card detects whether the profile is started. If the profile corresponding to the eSIM card does not exist, the detection ends.

When the profile corresponding to the eSIM card exists in the eSIM card, and the profile in the eSIM card is started, the generated eSIM card activation indicator indicates that the profile corresponding to the eSIM card is activated.

When the profile corresponding to the eSIM card does not exist in the eSIM card, or the profile in the eSIM card is not started, the generated eSIM card activation indicator indicates that the profile corresponding to the eSIM card is not activated.

S107: The modem determines, based on the eSIM card activation indicator, whether the profile of the eSIM card is activated.

The modem obtains the ISD-R response information returned by the eSIM card, and determines, based on the eSIM card activation indicator in the ISD-R response information, whether the profile corresponding to the eSIM card is activated.

For example, when the eSIM card activation indicator is 1 or true, the profile corresponding to the eSIM card is activated. When the eSIM card activation indicator is 0 or false, the profile corresponding to the eSIM card is not activated.

When the UE is started for the first time, the eSIM card is not activated, and the profile corresponding to the eSIM card is not downloaded. Therefore, the profile corresponding to the eSIM card is in an inactive state, and S106 is performed.

S108: When the profile corresponding to the eSIM card is not activated, the modem powers off the eSIM card.

When determining that the profile corresponding to the eSIM card is not activated, the modem sends a power-off instruction to the eSIM card, to instruct the eSIM card to be powered off. It should be noted that when no profile exists in the eSIM card, the modem powers off the eSIM card.

It may be understood that, when receiving the power-off instruction sent by the modem, the eSIM card in the UE is switched to a power-off state in response to the power-off instruction. When the eSIM card is powered off successfully, the eSIM card returns power-off response information to the modem to notify the modem that the eSIM card is powered off successfully.

It should be noted that in this application, a case in which the eSIM card is not activated is different from a case in which the profile is not activated. The eSIM card being not activated means that the eSIM card is not activated, that is, no profile exists in the eSIM card. The profile being not activated means that no activated profile exists in the eSIM card. One or more eSIM cards may exist in same UE. Although a plurality of profiles may exist in one eSIM card, a maximum of one profile is allowed to be activated at one moment for one eSIM card.

In this embodiment of this application, in an application scenario in which the UE is started or restarted, after the modem powers on the eSIM card, the profile corresponding to the eSIM card is not downloaded or activated because the eSIM card is not activated. In this case, to avoid a power waste caused by maintaining the eSIM card powered on, the modem powers off the eSIM card, to reduce power consumption of the eSIM card, reduce power consumption of the modem in the UE, and further reduce overall power consumption of the UE.

Figure 5:
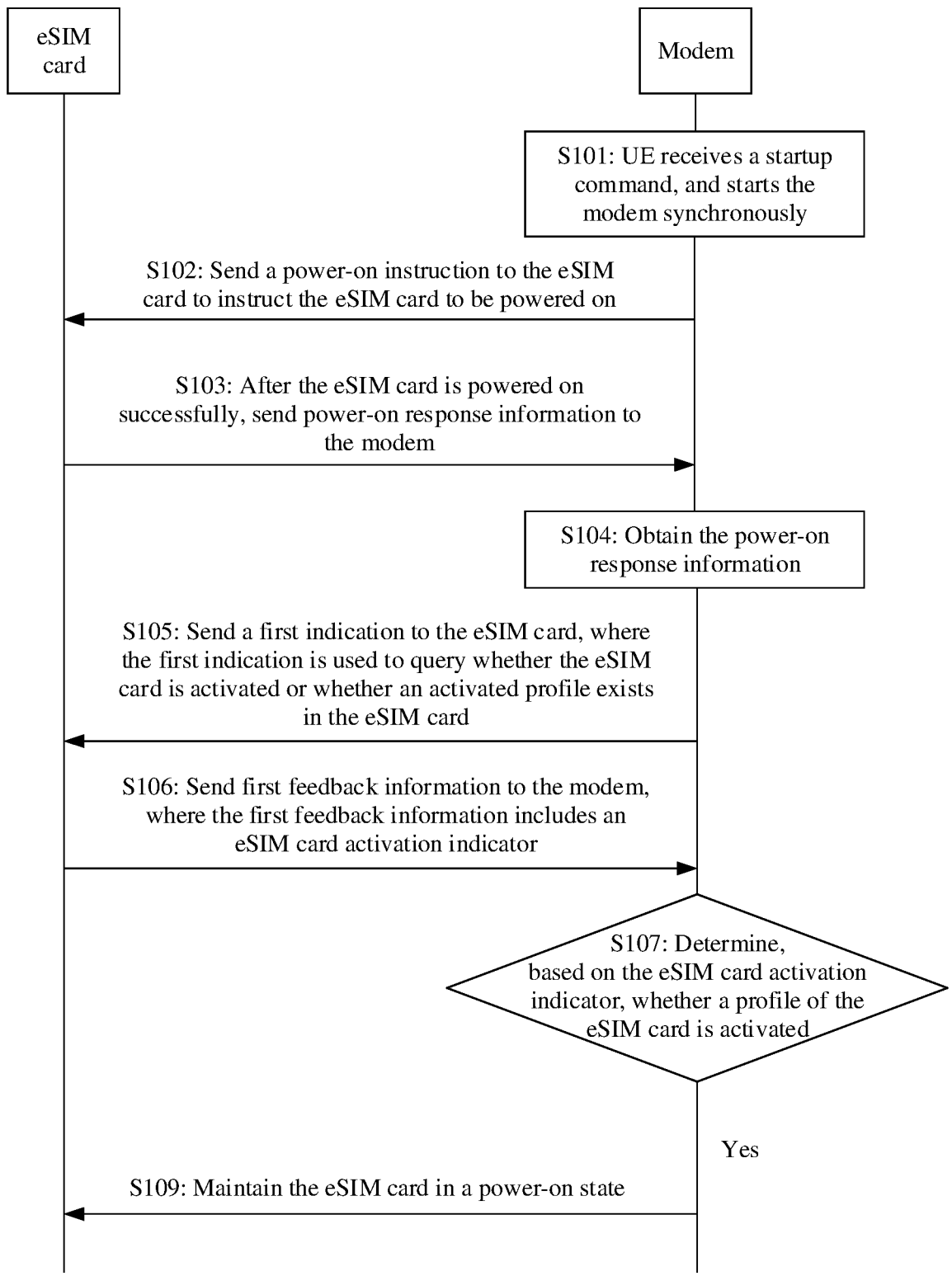
FIG. 5 is a schematic diagram of an application scenario for identifying an eSIM card according to a second embodiment of this application.

FIG. 5 is a schematic diagram of an application scenario for identifying an eSIM card according to a second embodiment of this application. The application scenario in this embodiment is a scenario in which the UE is started after an eSIM card in UE is activated. On the basis of FIG. 3, after S107, an eSIM card identification method in this embodiment further includes S109. Details are as follows:

S109: When the profile corresponding to the eSIM card is activated, the modem maintains the eSIM card in a power-on state.

When the modem determines that the profile corresponding to the eSIM card is activated, the user may use a related function of the eSIM card. Herein, the modem continuously powers on the eSIM card normally, to maintain the eSIM card in the power-on state, so that the user can normally use the eSIM card.

The foregoing describes the application scenario in which the UE is started or restarted, and after powering on the eSIM card, the UE determines whether the profile corresponding to the eSIM card is activated, to determine whether to power on the eSIM card. The following describes an implementation in which in a scenario in which the UE is started after the eSIM card in the UE is activated, after the UE powers on the eSIM card, the UE determines, based on a state of an LPA and a state of the profile, whether to power on the eSIM card. When the LPA is enabled or the profile is activated, the modem powers on the eSIM card. When the LPA is not enabled and the profile is not activated, the modem powers off the eSIM card.

Figure 6:
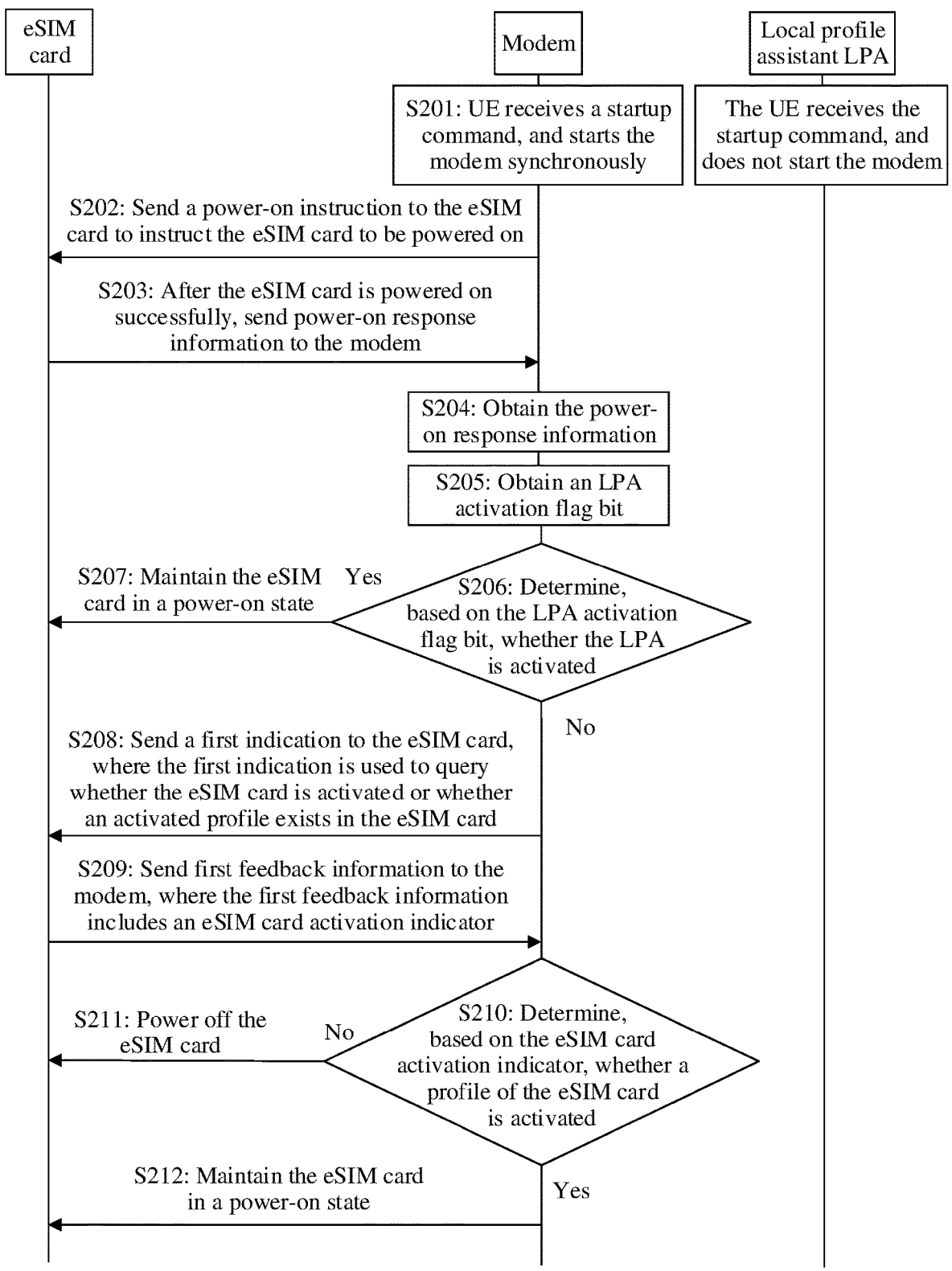
FIG. 6 is a schematic diagram of an application scenario for identifying an eSIM card according to a third embodiment of this application.

FIG. 6 is a schematic diagram of an application scenario for identifying an eSIM card according to a third embodiment of this application. The application scenario in this embodiment is a scenario in which the UE is started after an eSIM card in UE is activated. The UE includes the eSIM card, a modem, and an LPA used to manage a profile of the eSIM card. In a process in which the UE is started, the LPA is not started, and a user needs to manually enable the LPA. The LPA may be a separate app such as a "SIM management" app, or may be a function option. The user may activate the profile or deactivate the profile by using the LPA. Based on the embodiments corresponding to FIG. 3 and FIG. 5, in this embodiment, before the step of determining whether the profile corresponding to the eSIM card is activated, the method may further include related steps S205 to S207 of determining whether an LPA activation flag bit is activated. Details are as follows:

S205: The modem obtains the LPA activation flag bit, where the LPA activation flag bit indicates whether the LPA is activated.

The modem obtains the LPA activation flag bit after being started.

Usually, when the UE is delivered from the factory, the LPA activation flag bit is stored in the modem. Because the LPA is not activated at delivery, the LPA activation flag bit is in an inactive state by default at delivery. For example, a factory default value of the LPA activation flag bit may be 0 or false, to indicate that the LPA is not activated.

Figure 7:
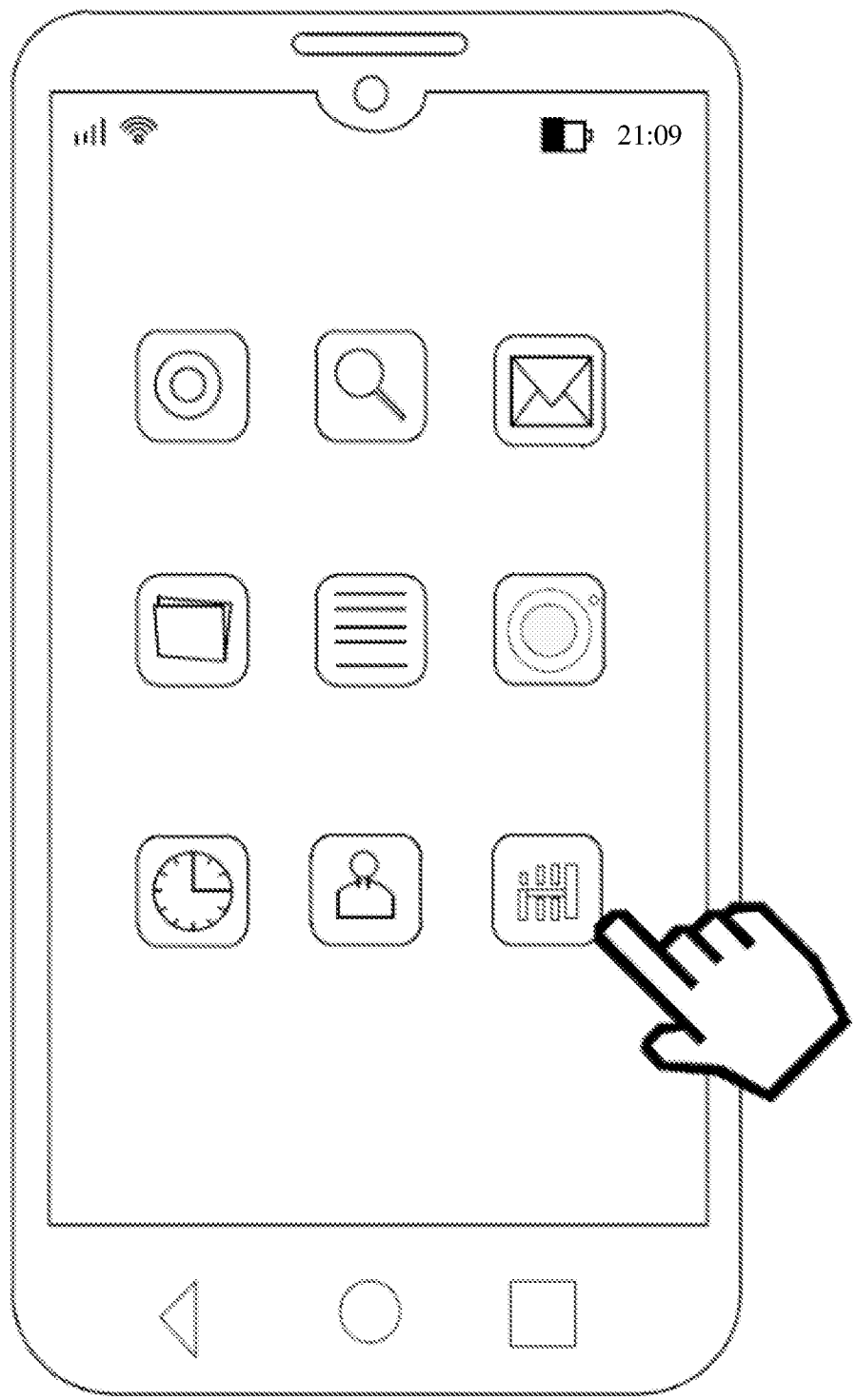
FIG. 7 is a diagram of a user interface according to another embodiment of this application.

For example, in a possible implementation, after being delivered from the factory, the UE may detect whether an app for managing the profile of the eSIM card is started, to determine whether the LPA is activated. When the UE detects that the application for managing the profile of the eSIM card is started, it indicates that the user activates the LPA in a process of using the UE, and the UE may set the LPA activation flag bit in the modem to be in an active state. For example, the user may tap an icon corresponding to a "SIM management" app in a user interface shown in FIG. 7, to trigger a start instruction used to instruct to start the "SIM management" app. When detecting the start instruction, the UE starts the "SIM management" app in response to the start instruction. When the UE detects that the "SIM management" app is started, the modem may set the LPA activation flag bit to 1 or true, to indicate that the LPA is activated. The started application for managing the profile of the eSIM card may run in the foreground or may run in the background. Therefore, in another possible implementation, the modem may set the LPA activation flag bit to be in the active state when the UE detects that the application for managing the profile of the eSIM card runs in the foreground or detects that the application is switched from the background to the foreground. The modem may set the LPA activation flag bit to be in the inactive state when the UE detects that the user closes the application used to manage the profile of the eSIM card or detects that the application is switched the foreground to the background.

S206: The modem determines, based on the obtained LPA activation flag bit, whether the LPA is activated.

For example, when the LPA activation flag bit is 1 or true, the LPA is activated and S207 is to be performed. When the LPA activation flag bit is 0 or false, the LPA is not activated. S208 to S211 are to be performed or S208 to S210 and S212 are to be performed.

S207: The modem maintains the eSIM card in a power-on state.

The modem powers on the eSIM card normally, to maintain the eSIM card in the power-on state.

In this embodiment, the UE determines, by using the LPA activation flag bit, whether the LPA is activated, to determine whether the user wants to interact with the eSIM card. When the LPA activation flag bit indicates that the LPA is activated, or the eSIM card activation indicator indicates that the profile corresponding to the eSIM card is activated, it indicates that the user needs to operate the eSIM card or needs to use a related function provided by the eSIM card. The modem maintains the eSIM card in the power-on state. When the LPA activation flag bit indicates that the LPA is not activated, and the eSIM card activation indicator indicates that the profile corresponding to the eSIM card is not activated, it indicates that the user does not need to use a related function provided by the eSIM card. The modem powers off the eSIM card. This reduces power consumption of the eSIM card, reduces power consumption of the modem, and reduces overall power consumption of the UE.

Figure 8A:
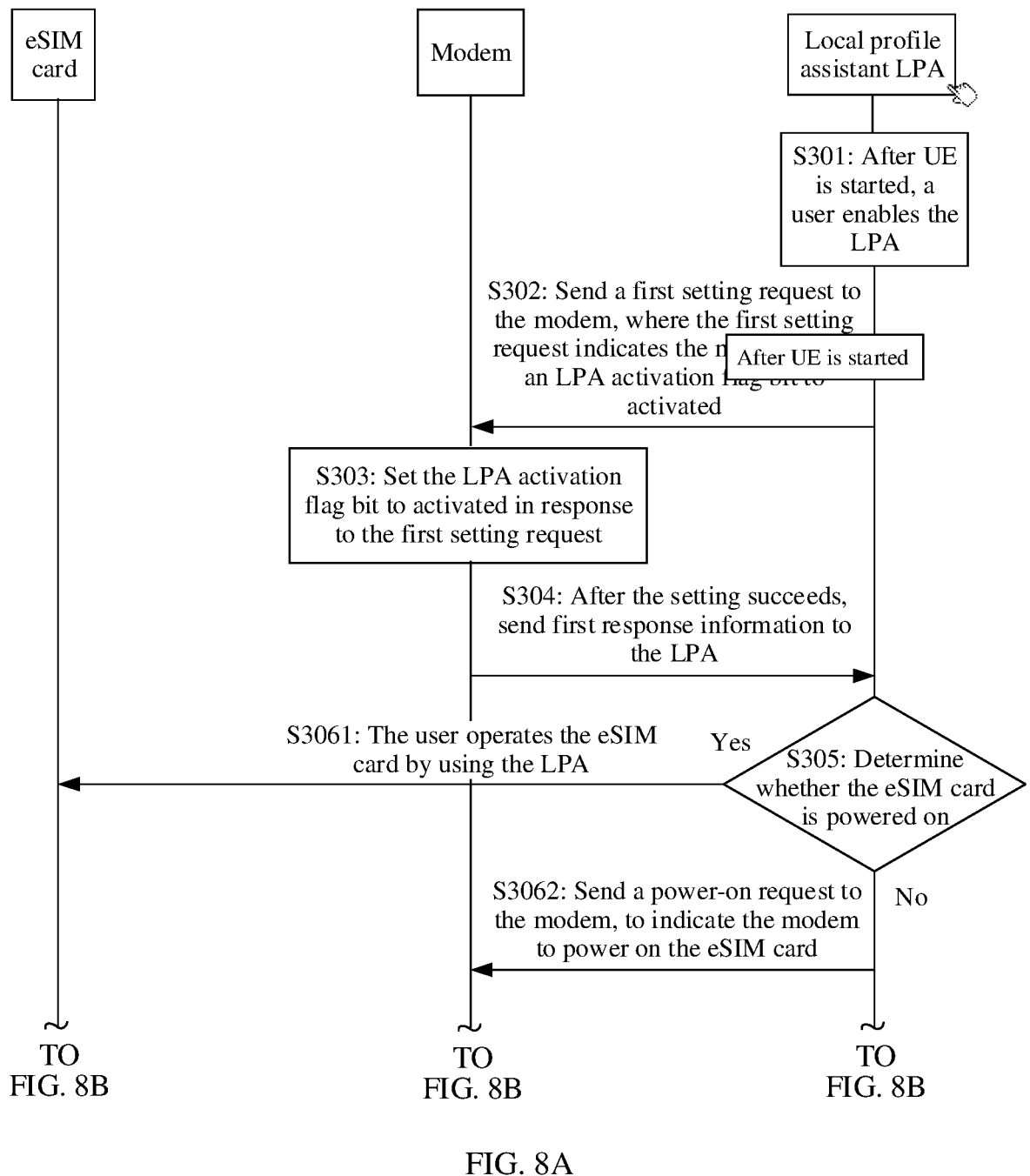
FIG. 8A to FIG. 8C are a schematic diagram of an application scenario for identifying an eSIM card according to a fourth embodiment of this application.
Figure 8B:
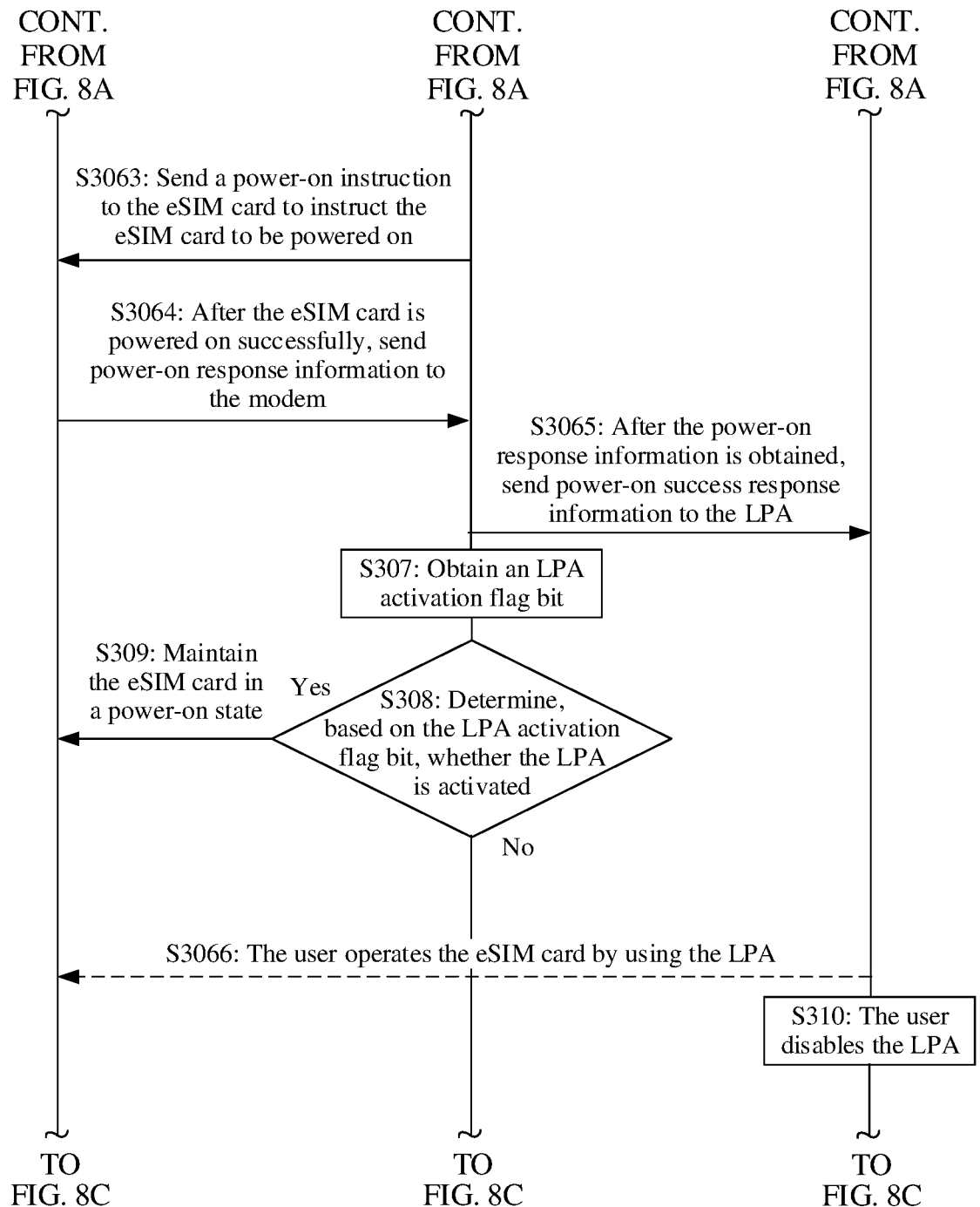
Figure 8C:
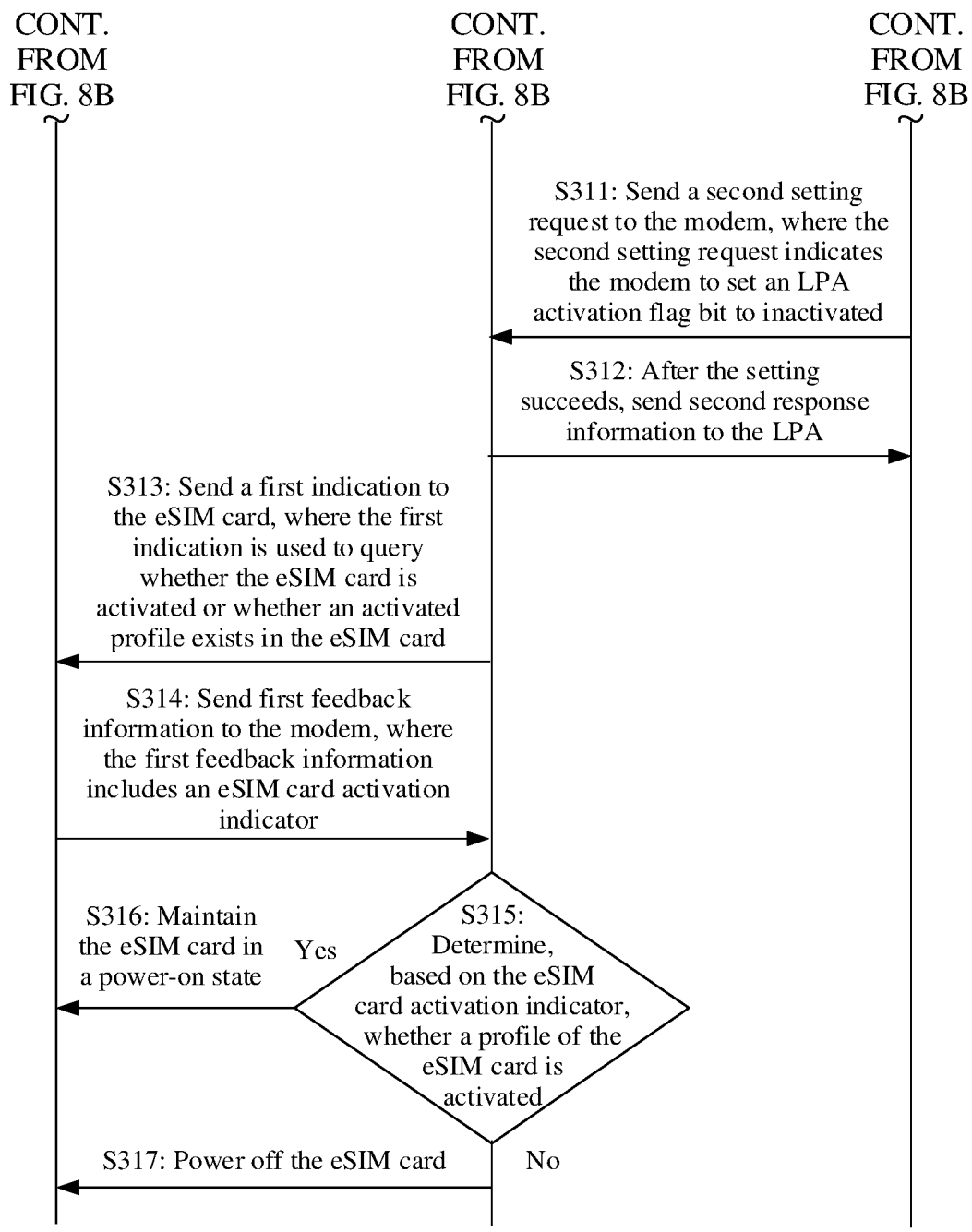

The foregoing describes the application scenario in which the UE identifies the eSIM card in a startup process. The following describes an application scenario in which after the UE is started, the user enables the LPA, and the UE identifies the eSIM card. FIG. 8A to FIG. 8C are a schematic diagram of an application scenario for identifying an eSIM card according to a fourth embodiment of this application. When a user enables an LPA after UE is started, the UE identifies an eSIM card according to steps shown in FIG. 8A to FIG. 8C.

After the user enables the LPA, a plurality of application scenarios are further included. The UE may perform corresponding steps in FIG. 8A to FIG. 8C according to different application scenarios.

For example, after the UE is started, the eSIM card has been powered on. When the user activates a profile of the eSIM card by using the LPA, the UE identifies the eSIM card according to steps shown in FIG. 9A and FIG. 9B.

Figure 10A:
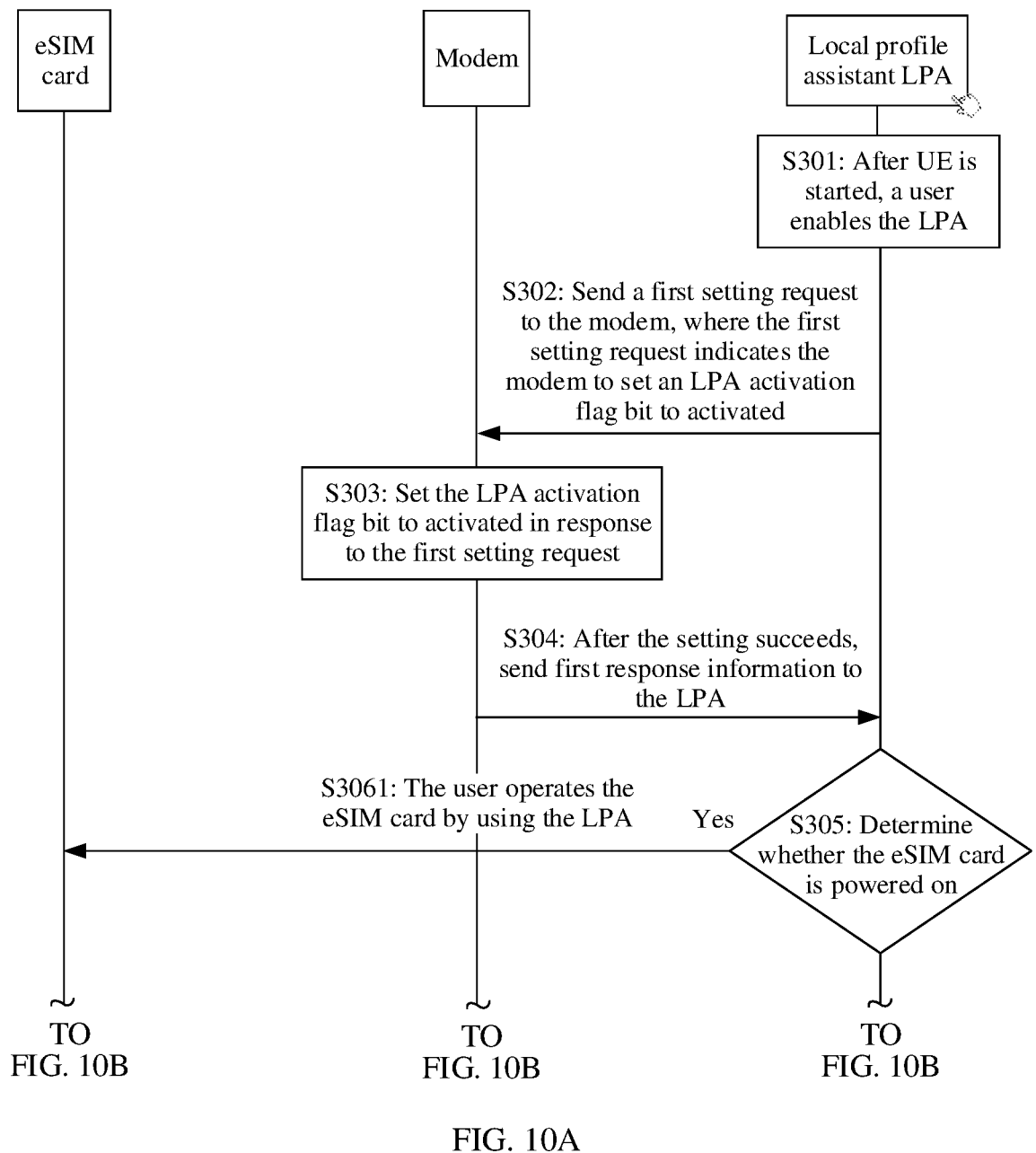
FIG. 10A and FIG. 10B are a schematic diagram of an application scenario for identifying an eSIM card according to a sixth embodiment of this application.
Figure 10B:
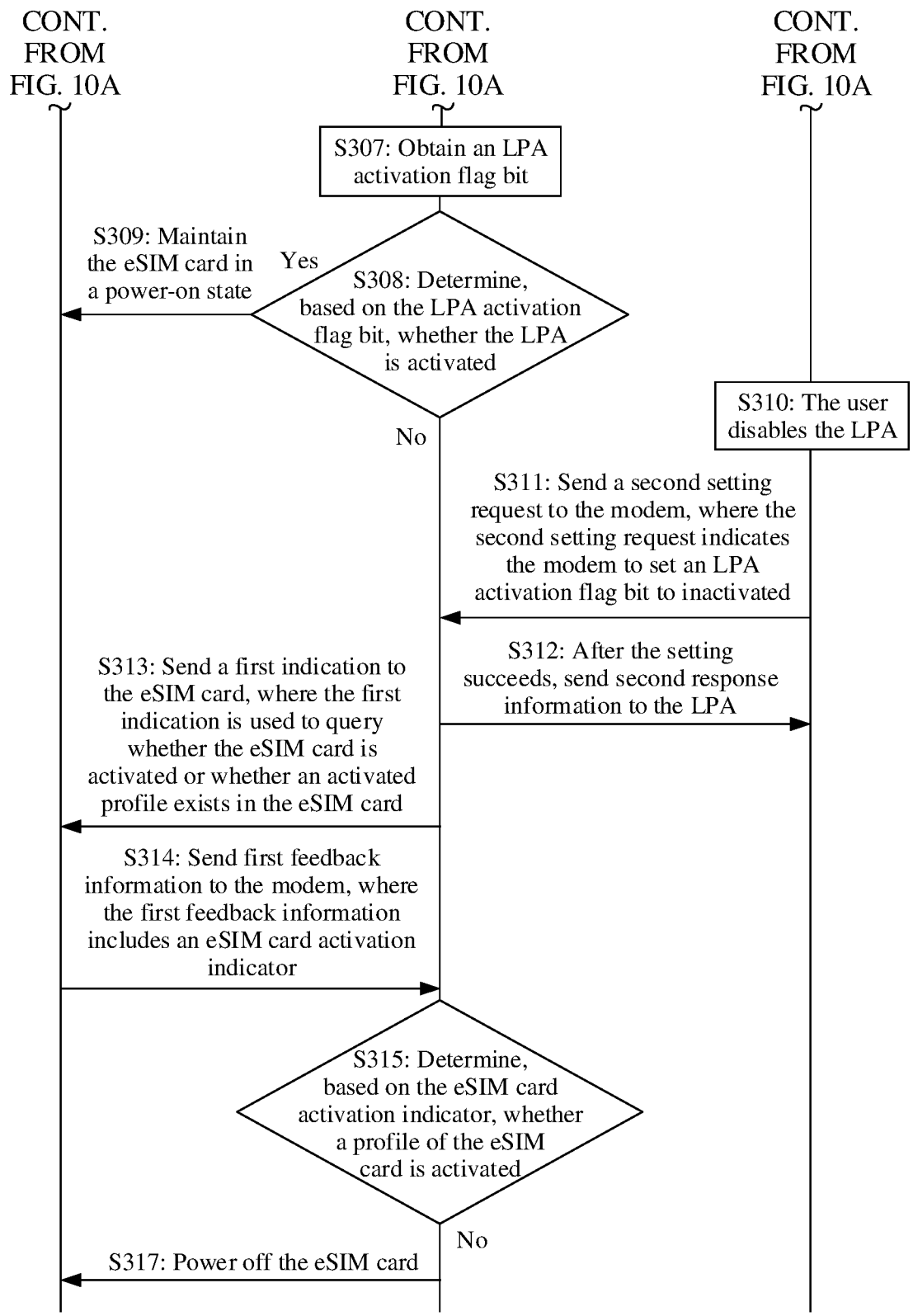

After the UE is started, the eSIM card has been powered on. The user only enables the LPA but does not activate the profile of the eSIM card. Alternatively, when the user deactivates the activated eSIM card by using the LPA or resets the eSIM card after the user activates the profile, to delete all profiles in the eSIM card, the UE identifies the eSIM card according to the steps shown in FIG. 10A and FIG. 10B. FIG. 10A and FIG. 10B are a schematic diagram of an application scenario for identifying an eSIM card according to a seventh embodiment of this application.

Figure 11A:
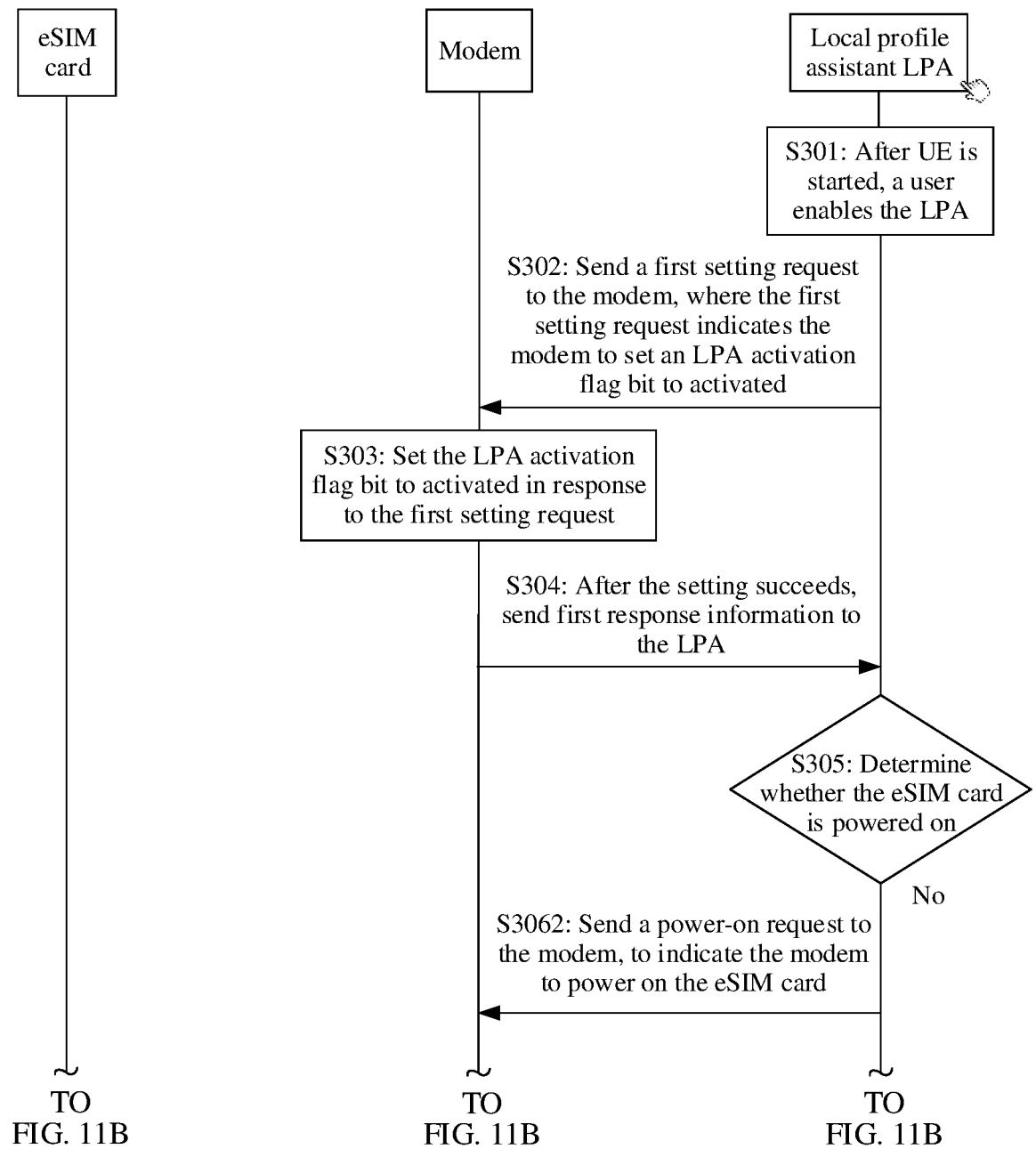
FIG. 11A to FIG. 11C are a schematic diagram of an application scenario for identifying an eSIM card according to a seventh embodiment of this application.
Figure 11B:
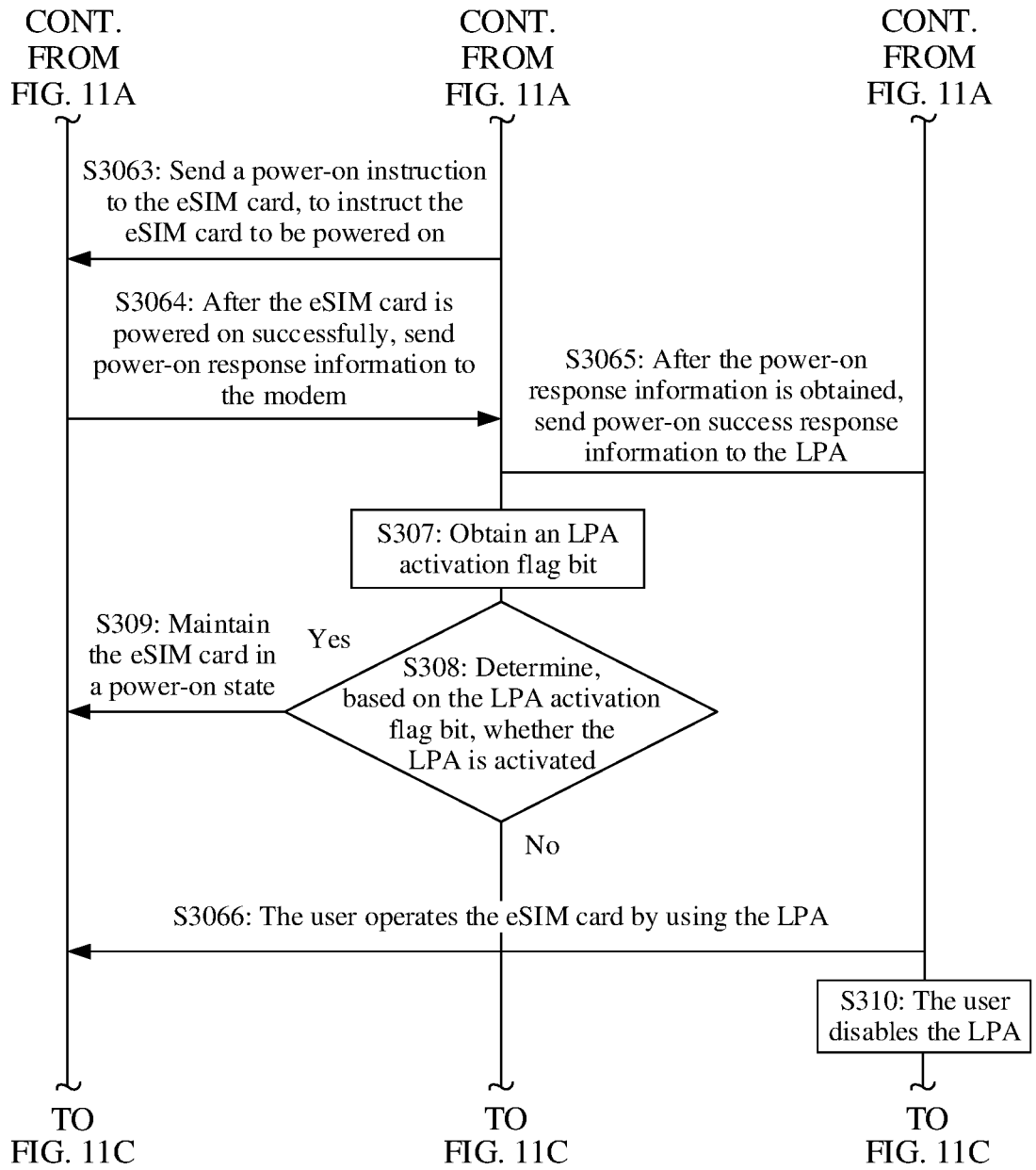
Figure 11C:
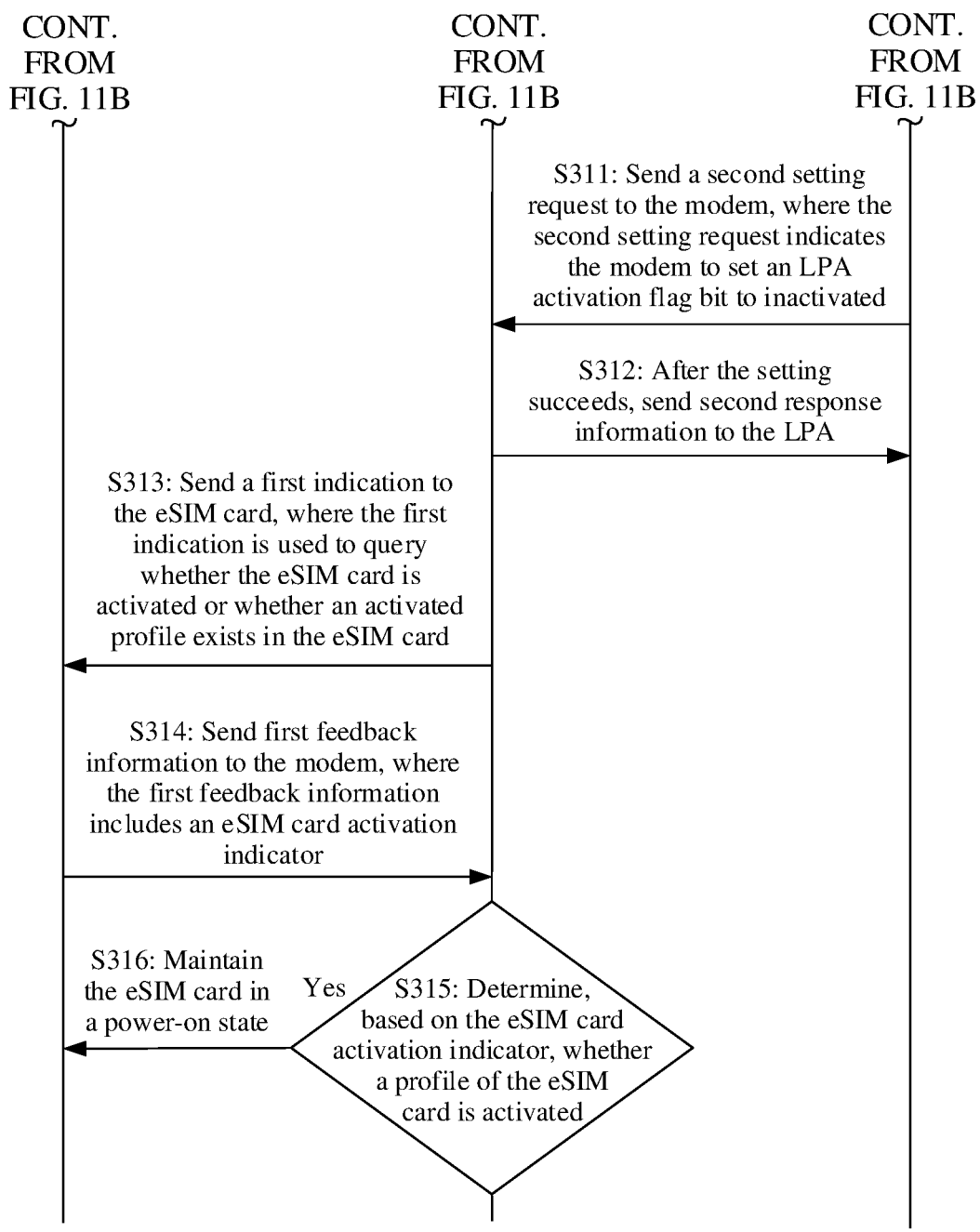

After the UE is started, the eSIM card is not powered on. When the user activates the profile of the eSIM card by using the LPA, the UE identifies the eSIM card according to steps shown in FIG. 11A to FIG. 11C. FIG. 11A to FIG. 11C are a schematic diagram of an application scenario for identifying the eSIM card according to a seventh embodiment of this application.

Figure 12A:
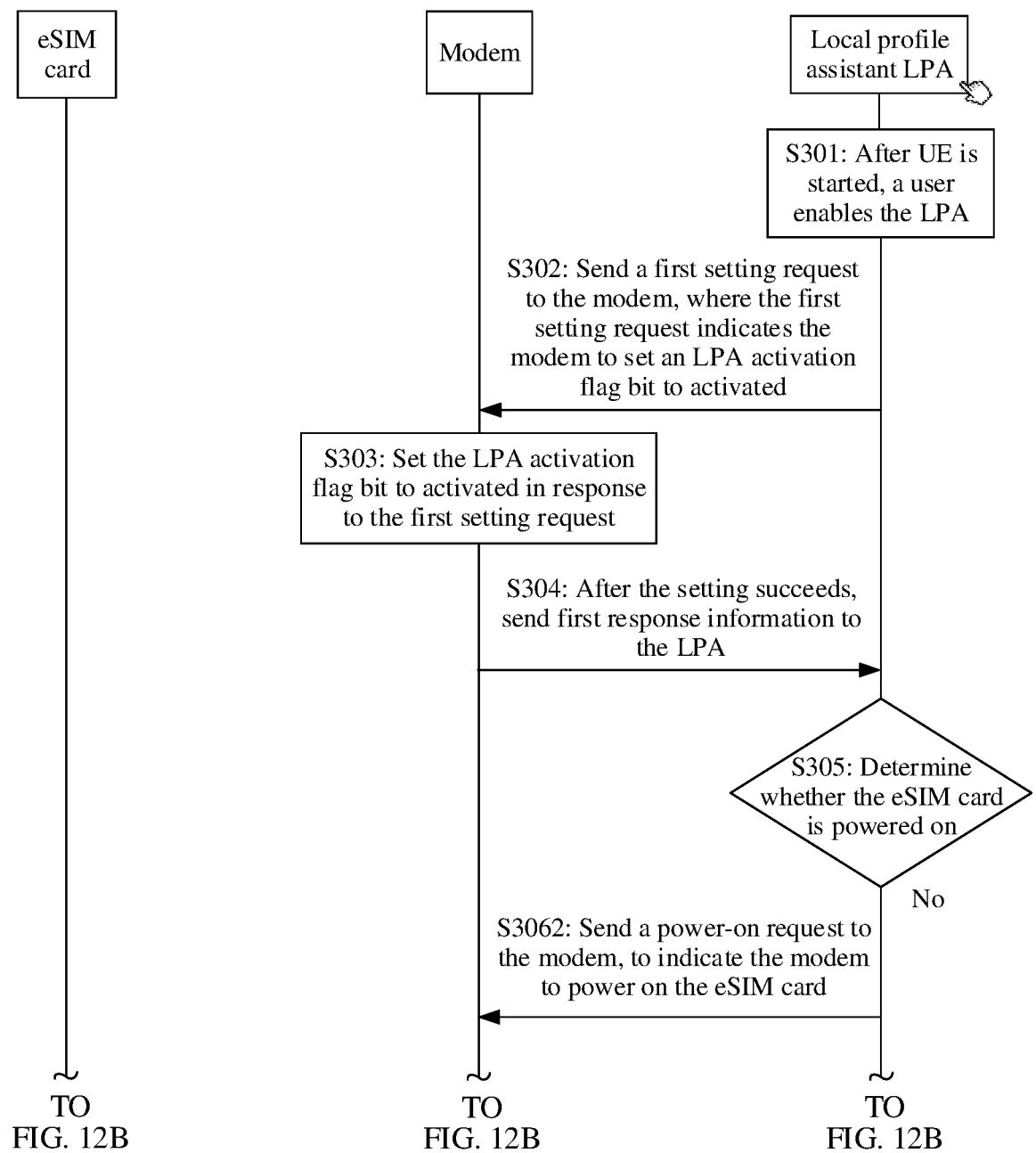
FIG. 12A to FIG. 12C are a schematic diagram of an application scenario for identifying an eSIM card according to an eighth embodiment of this application.
Figure 12B:
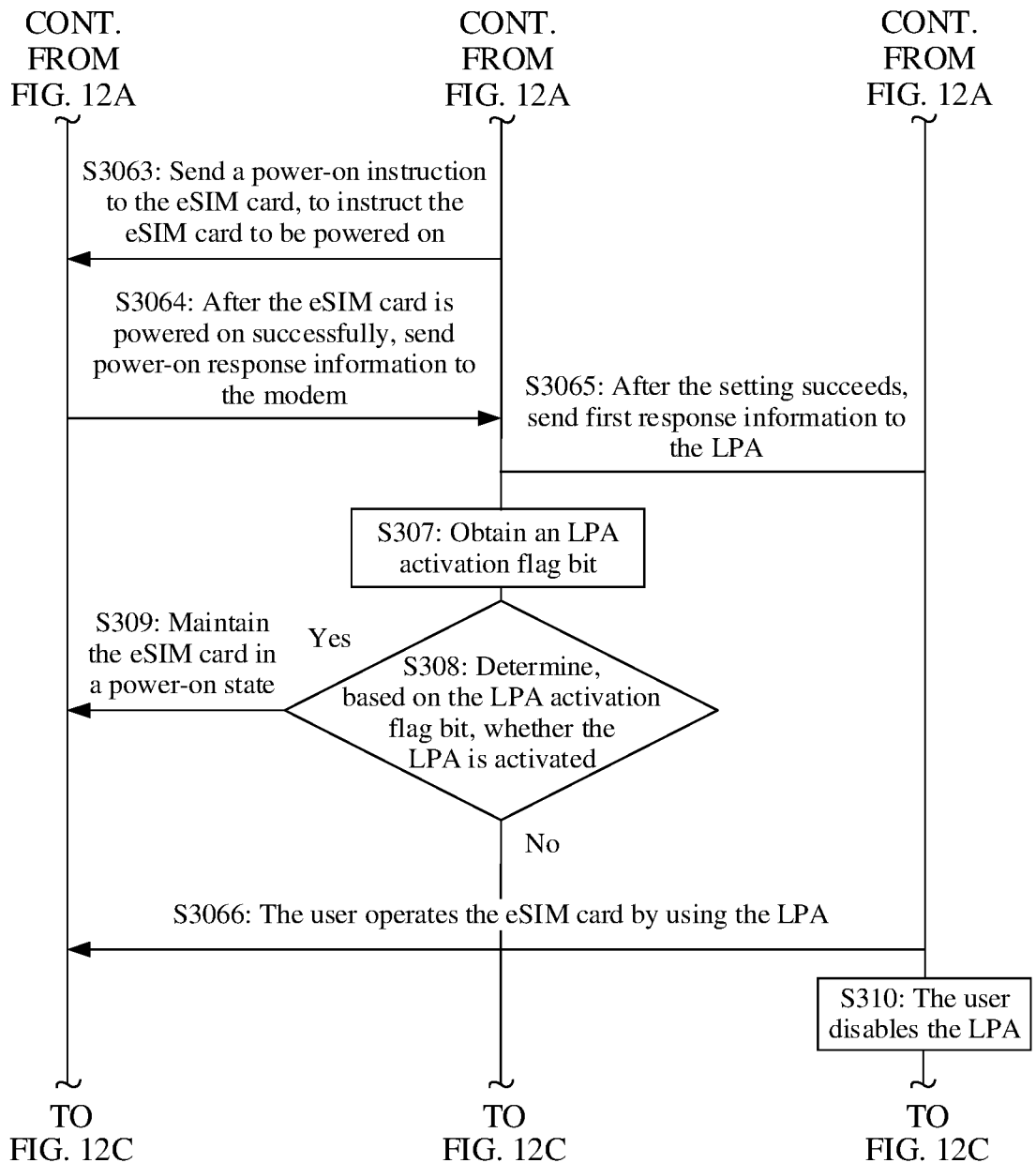
Figure 12C:
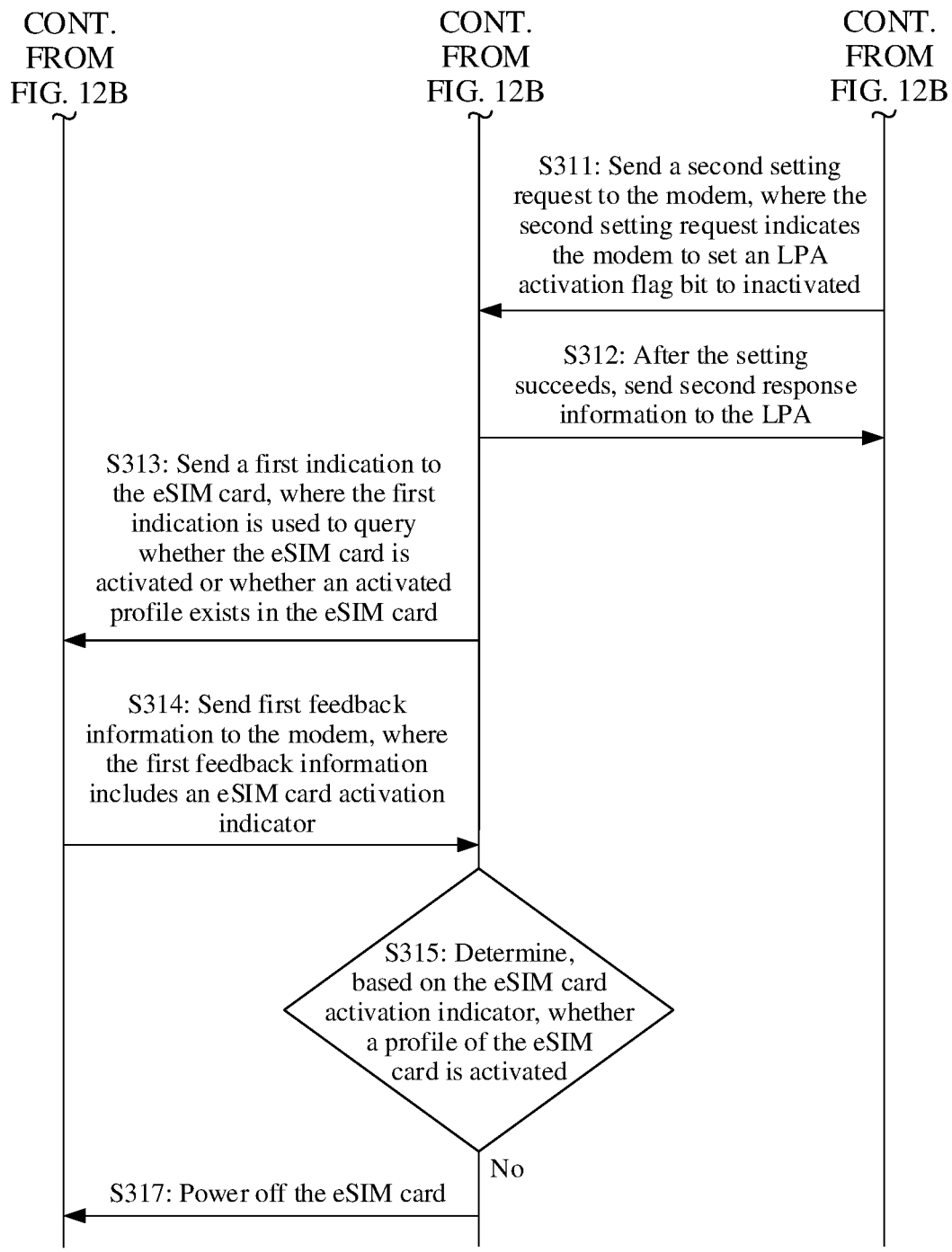

After the UE is started, the eSIM card is not powered on. The user only enables the LPA but does not activate the profile of the eSIM card. Alternatively, when the user deactivates the activated eSIM card by using the LPA or resets the eSIM card after the user activates the profile, to delete all profiles in the eSIM card, the UE identifies the eSIM card according to the steps shown in FIG. 12A to FIG. 12C. FIG. 12A to FIG. 12C are a schematic diagram of an application scenario for identifying the eSIM card according to an eighth embodiment of this application.

The following separately describes specific implementation processes in which the UE identifies the eSIM card in different application scenarios after the user enables the LPA.

Figure 9A:
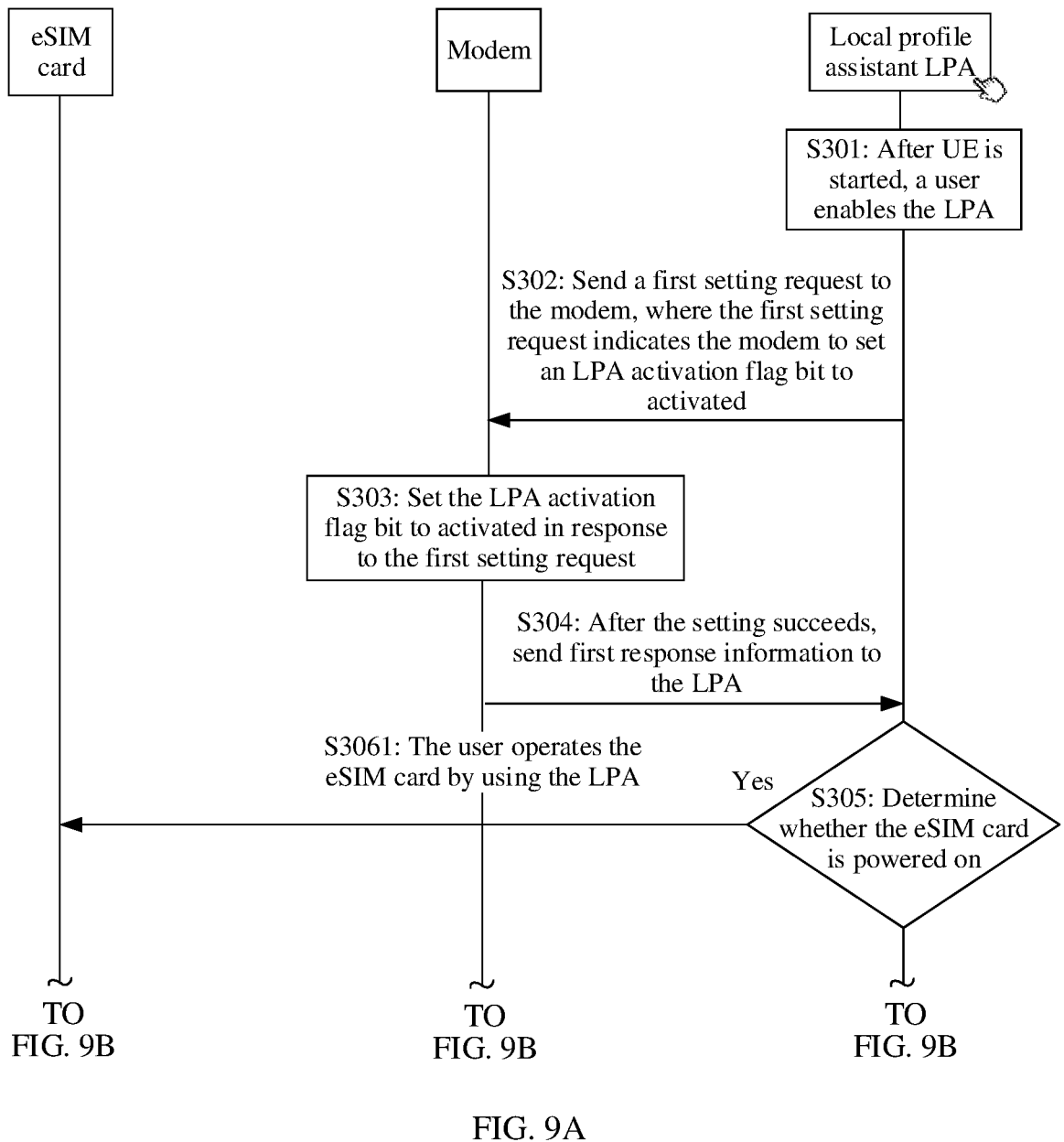
FIG. 9A and FIG. 9B are a schematic diagram of an application scenario for identifying an eSIM card according to a fifth embodiment of this application.
Figure 9B:
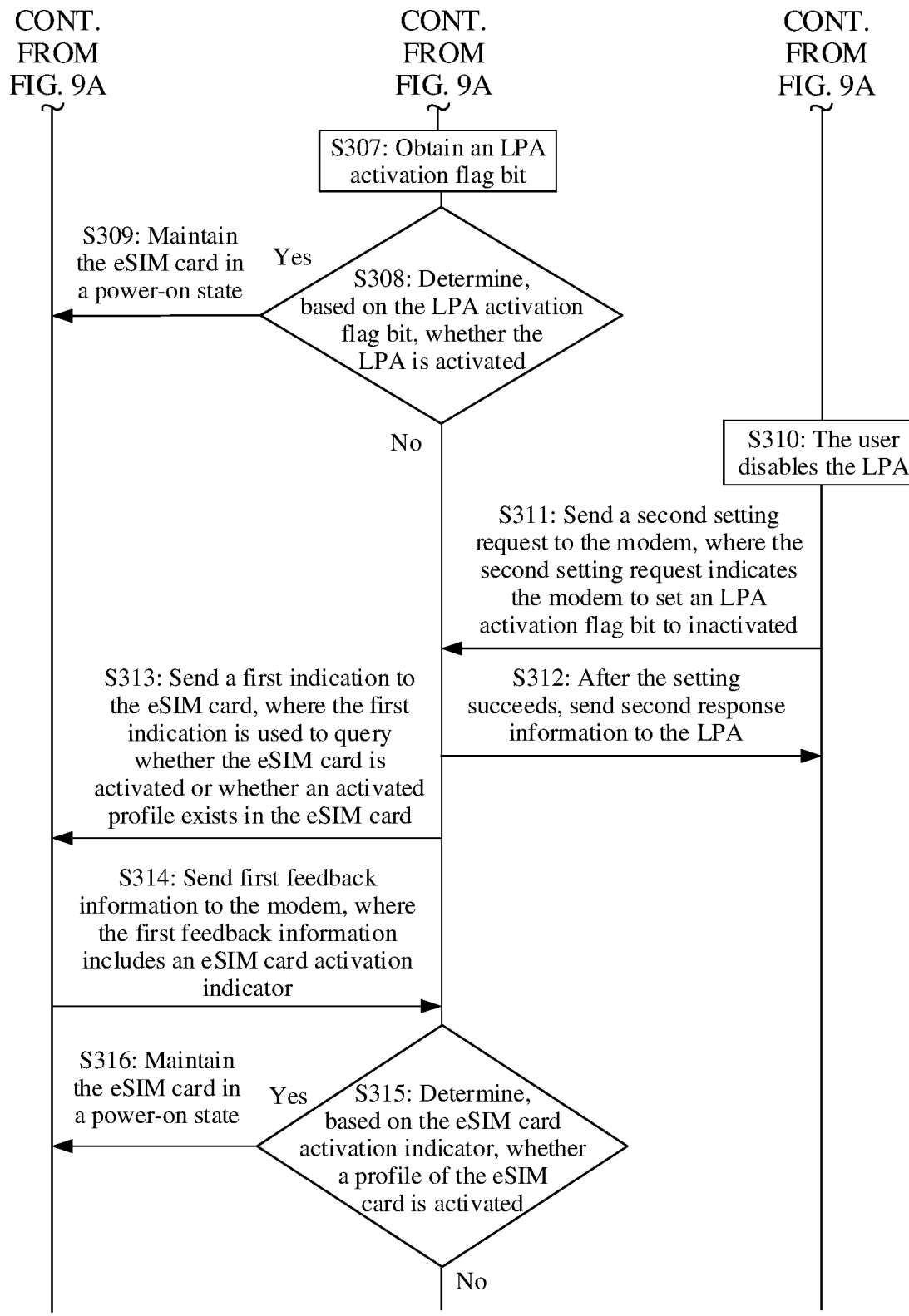

Refer to FIG. 9A and FIG. 9B together. FIG. 9A and FIG. 9B are a schematic diagram of an application scenario for identifying an eSIM card according to a fifth embodiment of this application. The application scenario in this embodiment is a scenario in which a user starts an LPA in UE after the UE is started and powers on an eSIM card. The eSIM card or a profile of the eSIM card needs to be activated by the user by using the LPA. Therefore, when detecting that the user activates the LPA, the UE needs to determine whether the user activates the profile of the eSIM card. An eSIM card identification method is specifically as follows:

S301: After the UE is started, the user enables the LPA.

After the UE is started, the user may tap an icon of an LPA application to start an LPA service process. After the LPA is started, the LPA may run in the foreground or in the background.

S302: The LPA of the UE sends a first setting request to a modem, where the first setting request indicates the modem to set an LPA flag bit to activated.

S303: The modem sets the LPA activation flag bit to activated in response to the first setting request.

When receiving the first setting request sent by the LPA, the modem sets the LPA activation flag bit to activated in response to the first setting request. When the UE is delivered from the factory, the LPA activation flag bit is set to inactivated by default.

S304: After the setting succeeds, the modem sends first response information to the LPA.

The modem sends the first response information to the LPA to notify the LPA that the modem sets the LPA activation flag bit to activated by default. For example, the modem sets the LPA activation flag bit to 1 or true, to indicate that the LPA is activated.

S305: The LPA of the UE determines whether the eSIM card is powered on.

The LPA of the UE may obtain an eSIM card flag bit through a data interface, and the eSIM card flag bit indicates whether the eSIM card is in position. The data interface may be a GetSimStatus interface. When the eSIM card flag bit indicates that the eSIM card is in position, the eSIM card is powered on. When the eSIM card flag bit indicates that the eSIM card is not in position, the eSIM card is not powered on.

The LPA of the UE may also determine, by using an eSIM card icon displayed in an UI interface of the LPA, whether the eSIM card is powered on. For example, when a color of the eSIM card icon displayed in the UI interface is gray, it indicates that the eSIM card is unavailable and the eSIM card is not powered on. When the color of the eSIM card icon displayed in the UI interface is dark green, it indicates that the eSIM card is available and the eSIM card is powered on.

It may be understood that, in another embodiment, the color of the eSIM card icon may also use another color, to indicate whether the eSIM card is available. This is not limited herein.

S3061: When the eSIM card is powered on, the user operates the eSIM card by using the LPA.

For example, the user may select an operator by using the UI of the LPA, sign a network service agreement with the operator, and tap an option "Activate the card" displayed in the UI of the LPA. The UE sends a registration request to an LPA server corresponding to the operator, to request the operator to activate a card. The registration request may include an international mobile equipment identity (International Mobile Equipment Identity, IMEI) of the UE and an electronic identity (electronic Identity, eID) of the eSIM card. The LPA server corresponding to the operator verifies whether the IMEI and the eID are correct, and allows the UE to register when determining that the IMEI and the eID are correct. The LPA server may perform registration based on the network service agreement signed with the user and the IMEI and the eID that are sent by the UE, and when the registration succeeds, update data information, for example, allocate related information such as an ICCID and an ISD P-AID to the UE, and indicate the user to perform a download service, so that the UE downloads a corresponding profile to the eSIM card, to activate the eSIM card. It may be understood that the user may apply to different operators for different eSIM numbers. Correspondingly, the eSIM card may include a plurality of profiles. The eSIM card may download a plurality of profiles. For example, the user may sign network service agreements with a plurality of operators or sign a plurality of network service agreements with a same operator. In some embodiments, one profile may correspond to one mobile number. In some embodiments, the eSIM may change parameter information in the card, for example, change a profile. In some embodiments, the profiles may be served by different mobile operators.

It may be understood that after activating the eSIM card, the user may further deactivate the eSIM card, for example, change a communications operator of the eSIM card, or replace a mobile number or cancel an activated mobile number without changing an original communications operator.

After activating the profile of the eSIM card, the user may also reset the eSIM card to delete all the profiles in the eSIM card and restore the eSIM card to factory settings.

It may be understood that when the eSIM card stores an eSIM card activation indicator, when the user operates the profile, the eSIM card may modify, based on the user operation, a value of the eSIM card activation indicator stored in the eSIM card.

For example, when the UE is delivered from the factory or the UE is started for the first time, the eSIM card activation indicator may be set to 0. When the user downloads and activates any profile, the eSIM may set the value of the eSIM card activation indicator to 1. When the user deletes the activated profile and no other profile is in an active state, the eSIM card may set the value of the eSIM card activation indicator to 0. After activating the profile, when the user resets the eSIM card to delete all profiles in the eSIM card, the eSIM card may set the value of the eSIM card activation indicator to 0.

S307: The modem obtains the LPA activation flag bit.

In this embodiment, S307 to S309 and S313 to S316 are respectively the same as S205 to S210 and S212 that are corresponding to FIG. 3. For details, refer to related descriptions of S205 to S210 and S212. Details are not described herein again.

It may be understood that in S303, the modem of the UE has set the LPA activation flag bit to activated. Therefore, the obtained LPA activation flag bit necessarily indicates that the LPA is activated, and S306 to S308 are optional steps. That is, in a possible implementation, when the LPA determines, after performing the S305, that the eSIM card is powered on, the LPA performs S309 to S312 or performs S309 to S311 and S313.

In a possible implementation, after the user enables the LPA, the LPA may also be disabled. Therefore, the modem may obtain the LPA activation flag bit at a preset time interval.

S308: The modem determines, based on the LPA activation flag bit, whether the LPA is activated.

S309: When determining that the LPA is activated, the modem maintains the eSIM card in a power-on state.

S310: The user disables the LPA.

After activating the profile in the eSIM card by using the LPA, the user may disable the LPA.

After activating the LPA, the user may also disable the LPA without any processing on the eSIM card. For example, the user activates the LPA due to a misoperation, and then disables the LPA. In this case, the user does not activate the eSIM card by using the LPA or activate the profile in the eSIM card.

For example, the user does not need to use the related function or service of the eSIM card at present. The user can only download the profile of the eSIM card by using the LPA without activating the profile.

S311: The LPA of the UE sends a second setting request to the modem, where the second setting request indicates the modem to set an LPA activation flag bit to inactivated.

When receiving the second setting request sent by the LPA, the modem sets the LPA activation flag bit to inactivated in response to the second setting request. When the modem sets the LPA activation flag bit to 0 or false, it indicates that the LPA is not activated.

S312: After the setting succeeds, the modem sends second response information to the LPA.

The second response information is used to notify the LPA that the modem has set the LPA activation flag bit to inactivated.

Because the modem performs the S307 and S308 at a preset time interval, after the modem sets the LPA activation flag bit to inactivated, when the modem performs the S307 and S308, and an obtained determining result is that the LPA is not activated.

When the LPA is not activated, the UE needs to continue to determine whether the profile corresponding to the eSIM card is activated, to determine, based on a determining result, whether to power off the eSIM card. Therefore, when the modem determines that the LPA is not activated, the modem performs S309.

S313: When determining that the LPA is not activated, the modem sends a first indication to the eSIM card, where the first indication is used to query whether the eSIM card is activated or whether an activated profile exists in the eSIM card.

Specifically, the UE sends issuer security domain root ISD-R selection request information to the eSIM card. The ISD-R selection request information is used to obtain an eSIM card indication identifier, and the eSIM card activation indicator is used to query whether the eSIM card is activated or the file profile corresponding to the eSIM card is activated. When an activated eSIM card or an activated profile exists, the UE queries a quantity of activated eSIM cards or profiles.

S314: The eSIM card sends first feedback information to the modem, where the first feedback information includes the eSIM card activation indicator.

Specifically, the eSIM card of the UE may send ISD-R response information to the modem, where the ISD-R response information includes the eSIM card activation indicator.

S315: The modem determines, based on the eSIM card activation indicator, whether the profile corresponding to the eSIM card is activated.

S316: When determining that the profile of the eSIM card is activated, the modem maintains the eSIM card in the power-on state.

It may be understood that when determining that any profile in the eSIM card is activated, the modem maintains the eSIM card in the power-on state.

In this embodiment, after the UE powers on the eSIM card, if it is detected that the user enables the LPA, that is, the LPA is in the active state, and the eSIM card is maintained in the power-on state. If the user disables the PLA, that is, the LPA is in the inactive state, it is continuously determined whether the profile of the eSIM card is activated. When the profile of the eSIM card is activated, the eSIM card is maintained in the power-on state.

In a possible implementation, based on FIG. 9A and FIG. 9B, in the following scenario, after performing S315, the UE performs S317 in FIG. 10A and FIG. 10B: The user enables the LPA, but does not download the profile of the eSIM card; or the user resets the eSIM card to delete all profiles; or no profile of the eSIM card is activated; or the user deactivates an activated eSIM card by using the LPA, so that all the profiles of the current eSIM card are in an inactive state.

S317: The modem powers off the eSIM card when determining that the profile of the eSIM card is not activated.

After determining that all the profiles in the eSIM are not activated, the modem powers off the eSIM, to reduce power consumption of the eSIM. There may be two cases in which all the profiles are not activated: No profile exists in the eSIM card; and the profiles exist in the eSIM card, but none of the profiles is activated.

In this embodiment, after the modem powers on the eSIM card, the user enables the LPA, but does not perform any operation on the eSIM card. Therefore, when the modem determines that no activated profile exists in the eSIM card, to avoid a power waste caused by maintaining the eSIM card powered on, the modem powers off the eSIM card.

In a possible implementation, after the UE is started, the eSIM card is not powered on. When the user activates the profile of the eSIM card by using the LPA, the UE identifies the eSIM card according to the steps shown in FIG. 11A to FIG. 11C. Based on FIG. 9A and FIG. 9B, when the determining result obtained after the UE performs S305 is the eSIM card, the UE performs S3062 to S365 shown in FIG. 11A to FIG. 11C, to indicate the modem to power on the eSIM card. After the eSIM card is powered on, the user can operate the eSIM card by using the LPA. S3066 in FIG. 11A to FIG. 11C is the same as S3061 in FIG. 9A and FIG. 9B, and details are not described herein. S3062 to S365 are specifically as follows:

S3062: The LPA sends a power-on request to the modem, to indicate the modem to power on the eSIM card.

S3063: The modem sends a power-on instruction to the eSIM card in the UE, to instruct the eSIM card to be powered on.

S3063 and S3064 are the same as S102 to S104. For details, refer to related descriptions in S102. Details are not described herein.

S3064: After being powered on successfully, the eSIM card sends power-on response information to the modem.

S3065: The modem obtains the power-on response information, and sends power-on success response information to the LPA.

The modem obtains the power-on response information sent by the eSIM card, and then sends the power-on success response information to the LPA, to notify the LPA that the eSIM card is powered on successfully.

In this embodiment, after the UE is started, the eSIM card being not powered on may mean that the UE is started for the first time and performs the step corresponding to FIG. 3 to power on and then power off the eSIM card; or after performing the S317 in FIG. 10A and FIG. 10B, the UE powers off the eSIM card.

A prerequisite for the user to operate the eSIM card by using the LPA is that the eSIM card is in the power-on state. Therefore, after the user enables the LPA, if the LPA determines that the eSIM card is in a power-off state, the LPA indicates the modem to power on the eSIM card.

In a possible implementation, after the UE is started, the eSIM card is not powered on, and the user only enables the LPA but does not activate the profile of the eSIM card. Alternatively, when the user deactivates the activated eSIM card by using the LPA, the UE identifies the eSIM card according to steps shown in FIG. 12A to FIG. 12C. Based on FIG. 11A to FIG. 11C, when a determining result obtained by the UE by performing S315 is that all the profiles of the eSIM card are in an inactive state, the UE performs S317 in FIG. 12A to FIG. 12C to power off the eSIM card.

In the foregoing solution, when the eSIM card is not activated or the profile corresponding to the eSIM card is not activated, the UE powers off the eSIM card. When it is detected that the LPA is in an active state, it indicates that the user may need to operate the eSIM card by using the LPA application, and the UE powers on the eSIM card. In embodiments of this application, when it is detected that the LPA is in an inactive state, the user does not need to use a related function of the eSIM card, and the UE powers off the eSIM card, to reduce power consumption of the eSIM card, reduce standby power consumption of the UE, and increase a battery life.

The eSIM card activation indicator is sent by the eSIM card to the modem instead of being directly stored in the modem, and therefore does not need to be occupy memory space of the modem.

It should be understood that a sequence number of each step in the foregoing embodiments does not mean a sequence of execution. An execution sequence of each process should be determined by a function and internal logic of the process, and should not constitute any limitation on an implementation process in embodiments of this application.

Figure 13:
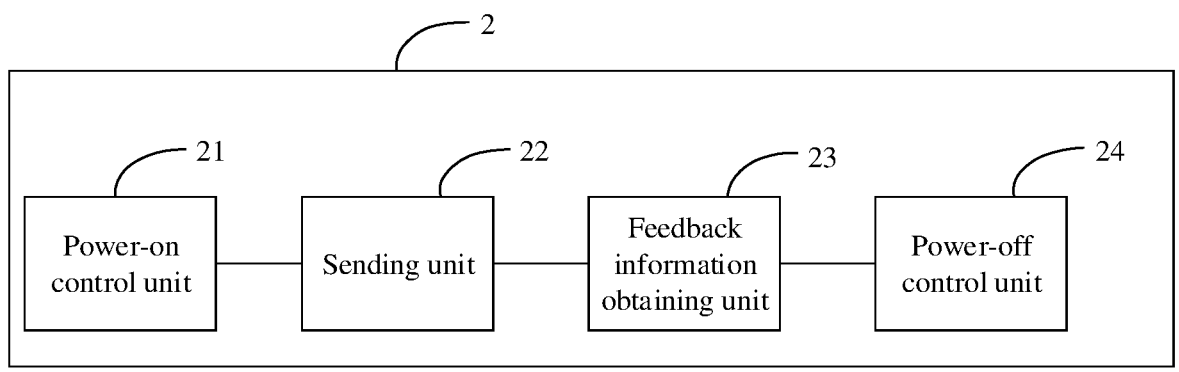
FIG. 13 is a schematic diagram of a structure of a terminal device according to an embodiment of this application.

Corresponding to the eSIM card identification method described in the foregoing embodiments, FIG. 13 shows a schematic diagram of a structure of an eSIM card identification apparatus according to an embodiment of this application. For ease of description, only a part related to embodiments of this application is shown.

Refer to FIG. 13. The apparatus includes:
a power-on control unit 21, configured to: after the terminal device completes an initialization process, drive an eSIM card to be powered on;
a sending unit 22, configured to send a first indication to the eSIM card, where the first indication is used to query whether the eSIM card is activated or whether an activated profile exists in the eSIM card;
a feedback information obtaining unit 23, configured to obtain first feedback information sent by the eSIM card, where the first feedback information includes an eSIM card activation indicator; and
a power-off control unit 24, configured to power off the eSIM card when the eSIM card activation indicator indicates that the eSIM card is not activated or no activated profile exists in the eSIM card.

In some embodiments, the initialization process includes an initialization process of a modem and an initialization process of a processor.

In some embodiments, the first indication is issuer security domain root ISD-R selection request information, and the first feedback information is ISD-R response information.

In some embodiments, after obtaining the first feedback information sent by the eSIM card, the power-on control unit 11 is further configured to: maintain the eSIM card in a power-on state when the eSIM card activation indicator indicates that an activated profile exists in the eSIM card.

In some embodiments, the apparatus further includes an LPA obtaining unit, configured to obtain an LPA activation flag bit before the power-on control unit 21 drives the eSIM card to be powered on or before the sending unit 22 sends the first indication to the eSIM card, where the LPA activation flag bit indicates whether a local profile assistant LPA is activated; and
the power-on control unit 21 is further configured to: when the LPA activation flag bit indicates that the LPA is activated, maintain the eSIM card in the power-on state.

In some embodiments, the sending unit 22 is further configured to: after the LPA obtaining unit obtains the LPA activation flag bit, when the LPA activation flag bit indicates that the LPA is not activated, send the first indication to the eSIM card.

In some embodiments, the apparatus further includes:
a setting request obtaining unit, configured to obtain a first setting request before the LPA obtaining unit obtains the LPA activation flag bit, where the first setting request is triggered when a user enables the LPA, and the first setting request indicates the modem to set the LPA flag bit to activated; and
a setting unit, configured to set the LPA activation flag bit to activated in response to the first setting request.

In some embodiments, the setting request obtaining unit is further configured to obtain a second setting request after the setting unit sets the LPA activation flag bit to activated, where the second setting request is triggered by disabling the LPA by the user when the eSIM card is in the power-on state, and the second setting request indicates the modem to set the LPA flag bit to inactivated;
the setting unit is further configured to set the LPA activation flag bit to inactivated in response to the second setting request.

In some embodiments, the power-on control unit is further configured to:
after the setting unit sets the LPA activation flag bit to activated, and before the LPA obtaining unit obtains the LPA activation flag bit, obtain a power-on request, where the power-on request is triggered by the LPA when the eSIM card is not powered on; and in response to the power-on request, drive the eSIM card to be powered on.

In some embodiments, the ISD-R response information comprises the following three fields: lpaeUsingCatSupported (0), lpaeUsingScwsSupported (1), and enabledProfile (2); lpaeUsingCatSupported (0) indicates whether an embedded universal integrated circuit card eUICC supports a card application toolkit; lpaeUsingScwsSupported (1) indicates whether the eUICC supports a smart card web server; and enabledProfile (2) indicates whether the eUICC includes an activated profile.

In some embodiments, powering on or powering off the eSIM card is controlled by the modem of the terminal device.

In some embodiments, the apparatus further includes:
an activation flag bit obtaining unit, configured to obtain an LPA activation flag bit.

The power-on control unit 21 is further configured to maintain the eSIM card in a power-on state when the LPA activation flag bit indicates that an LPA is activated, or the eSIM card activation indicator indicates that an activated profile exists in the eSIM card.

The power-off control unit 24 is further configured to power off the eSIM card when the LPA activation flag bit indicates that an LPA is not activated, and the eSIM card activation indicator indicates that the eSIM card is not activated or no activated profile exists in the eSIM card.

In this embodiment, the eSIM card identification apparatus may be a terminal device, for example, a mobile phone, or a chip in the terminal device, for example, a modem, or a function module integrated in the terminal device. The chip or the function module may be located in a control center (for example, a console) of the terminal device, to control the terminal device to implement the eSIM card identification method provided in this application.

It should be noted that content such as information exchange and execution processes between the foregoing apparatuses/units is based on the same concept as embodiments of the eSIM card identification method in this application. For details of specific functions and technical effects, refer to the foregoing embodiment of the eSIM card identification method. Details are not described herein again. Various implementations of this application may be combined randomly to implement different technical effects.

Figure 14:
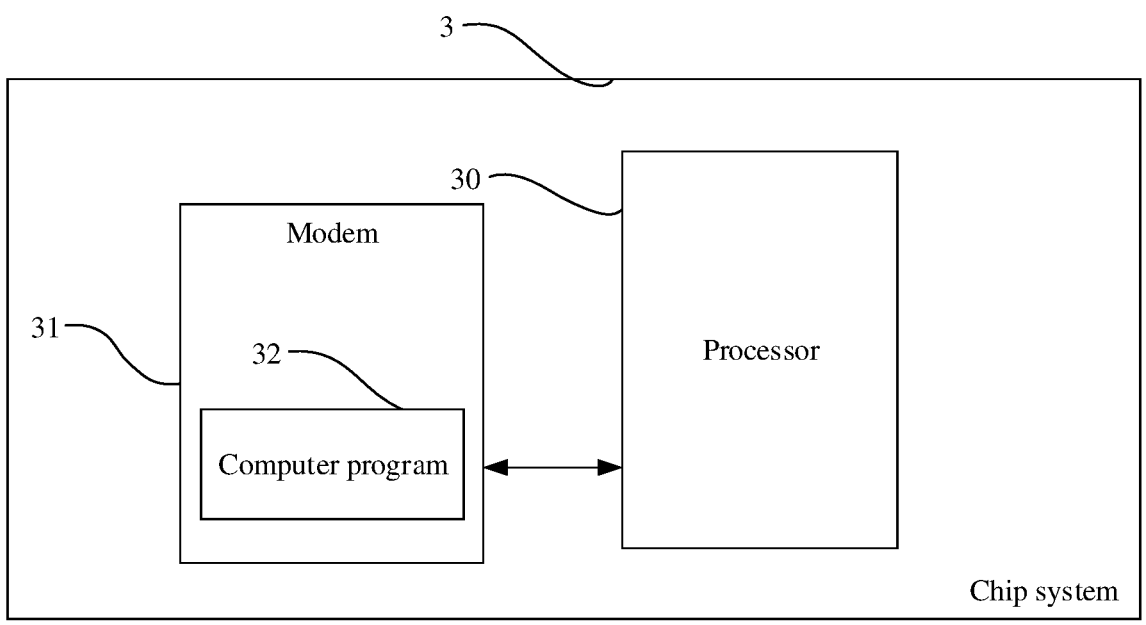
FIG. 14 is a schematic diagram of a structure of a chip system according to an embodiment of this application.

FIG. 14 is a schematic diagram of a structure of a chip system according to an embodiment of this application. As shown in FIG. 14, a chip system 3 in this embodiment includes: at least one processor 30 (only one processor is shown in FIG. 14), a modem 31, and a computer program 32 that is stored in the modem 31 and may run on the at least one processor 30. When executing the computer program 32, the processor 30 implements the steps in the foregoing embodiments of the eSIM card identification method.

The chip system 3 may include but is not limited to the processor 30 and the modem 31. A person skilled in the art may understand that FIG. 14 is merely an example of the chip system 3, and does not constitute a limitation on the chip system 3. The chip system 3 may include more or fewer components than those shown in the figure, or some components are combined, or there is a different component.

The processor 30 may be an AP, or may be a central processing unit (Central Processing Unit, CPU). The processor 30 may alternatively be another processor. This is not limited herein.

Embodiments of this application further provide a computer-readable storage medium. The computer-readable storage medium stores a computer program. When the computer program is executed by a processor, the steps in the foregoing method embodiments can be implemented.

Embodiments of this application provide a computer program product. When the computer program product is run on a terminal device, the terminal device is enabled to implement the steps in the foregoing method embodiments when executing the computer program product.

With descriptions of the foregoing implementations, a person skilled in the art may clearly understand that this application may be implemented by hardware, firmware, or a combination thereof. When this application is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a computer. Examples of the computer-readable medium include but are not limited to: A computer-readable medium may include a read-only memory (Read-Only Memory, ROM), a random access memory (Random Access Memory, RAM), an electrically erasable programmable read-only memory (Electrically Erasable Programmable read only memory, EEPROM), a compact disc read-only memory (Compact Disc Read-Only Memory, CD-ROM) or another compact disk storage, a magnetic disk storage medium or another magnetic storage device, or any other medium that can be configured to carry or store desired program code in a form of instructions or a data structure and that is accessible to a computer. In addition, any connection may be appropriately defined as a computer-readable medium. For example, if the software is transmitted from a website, a server, or another remote source through a coaxial cable, an optical fiber/cable, a twisted pair, a digital subscriber line (DSL), or wireless technologies such as infrared ray, radio, and microwave, the coaxial cable, optical fiber/cable, twisted pair, DSL, or wireless technologies such as infrared, radio, and microwave all fall within the definitions of the media medium. For example, a disk (Disk) and a disc (disc) used in this application include a compact disc (CD), a laser disc, an optical disc, a digital versatile disc (DVD), a floppy disk, and a Blu-ray disc. The disk usually uses magnetism to copy data, and the disc uses lasers to copy data. The foregoing combination shall also be included in the protection scope of the computer-readable medium.

In the foregoing embodiments, the descriptions of embodiments have respective focuses. For a part that is not described or recorded in detail in an embodiment, refer to related descriptions in other embodiments.

The foregoing embodiments are merely intended to describe the technical solutions of this application, but not to limit this application. Although this application is described in detail with reference to the foregoing embodiments, persons of ordinary skill in the art should understand that they may still make modification to the technical solutions described in the foregoing embodiments or make equivalent replacements to some technical features thereof, without departing from the spirit and scope of the technical solutions of embodiments of this application.

Finally, it should be noted that the foregoing descriptions are merely specific implementations of this application, but the protection scope of this application is not limited thereto. Any variation or replacement within the technical scope disclosed in this application shall fall within the protection scope of this application. Therefore, the protection scope of this application shall be subject to the protection scope of the claims.

The invention claimed is:
1. A terminal device, comprising:
an embedded subscriber identity module (eSIM) card, configured to download or store a profile;

at least one processor, configured to receive a startup command, and perform an initialization process in response to the startup command; and a modem, configured to:
after the initialization process is completed, drive an eSIM card to be powered on;
send a first indication to the eSIM card, wherein the first indication queries whether an activated profile exists in the eSIM card, and the first indication is issuer security domain root (ISD-R) selection request information;
obtain first feedback information sent by the eSIM card, wherein the first feedback information is ISD-R response information, the ISD-R response information comprises a field enabledProfile (2), wherein the enabledProfile (2) indicates whether an embedded universal integrated circuit card (eUICC) comprises an activated profile; and
power off the eSIM card when the first feedback information indicates that no activated profile exists in the eSIM card.

2. An embedded subscriber identity module (eSIM) card identification method applicable to a terminal device, comprising:
after the terminal device completes an initialization process, driving an eSIM card to be powered on;
sending a first indication to the eSIM card, wherein the first indication queries whether an activated profile exists in the eSIM card, and the first indication is issuer security domain root (ISD-R) selection request information;
obtaining first feedback information sent by the eSIM card, wherein the first feedback information is ISD-R response information, the ISD-R response information comprises a field enabledProfile (2), and wherein the enabledProfile (2) indicates whether an embedded universal integrated circuit card (eUICC) comprises an activated profile; and
powering off the eSIM card when the first feedback information indicates that no activated profile exists in the eSIM card.

3. The method according to claim 2, wherein the initialization process comprises an initialization process of a modem and an initialization process of a processor.

4. The method according to claim 2, wherein after obtaining first feedback information sent by the eSIM card, the method further comprises:
maintaining the eSIM card in a power-on state when the first feedback information indicates that an activated profile exists in the eSIM card.

5. The method according to claim 2, wherein before driving the eSIM card to be powered on or sending the first indication to the eSIM card, the method further comprises:
obtaining a local profile assistant (LPA) activation flag bit, wherein the LPA activation flag bit indicates whether an LPA is activated; and
when the LPA activation flag bit indicates that the LPA is activated, maintaining the eSIM card in the power-on state.

6. The method according to claim 5, wherein after obtaining the LPA activation flag bit, the method further comprises:
when the LPA activation flag bit indicates that the LPA is not activated, sending the first indication to the eSIM card.

7. The method according to claim 5, wherein before obtaining the LPA activation flag bit, the method further comprises:
obtaining a first setting request, wherein the first setting request is triggered when a user enables the LPA, and the first setting request indicates the modem to set the LPA activation flag bit to activated; and
setting the LPA activation flag bit to activated in response to the first setting request.

8. The method according to claim 7, wherein after setting the LPA activation flag bit to activated, the method further comprises:
obtaining a second setting request, wherein the second setting request is triggered by disabling the LPA by the user when the eSIM card is in the power-on state, and the second setting request indicates the modem to set the LPA activation flag bit to inactivated; and
setting the LPA activation flag bit to inactivated in response to the second setting request.

9. The method according to claim 7, wherein after setting the LPA activation flag bit to activated, and before obtaining the LPA activation flag bit, the method further comprises:
obtaining a power-on request, wherein the power-on request is triggered by the LPA when the eSIM card is not powered on; and
in response to the power-on request, driving the eSIM card to be powered on.

10. The method according to claim 3, wherein the ISD-R response information further comprises the following fields: IpaeUsingCatSupported (0) and IpaeUsingScwsSupported (1);
IpaeUsingCatSupported (0) indicates whether the eUICC supports a card application toolkit;
IpaeUsingScwsSupported (1) indicates whether the eUICC supports a smart card web server.

11. The method according to claim 2, further comprising:
obtaining an LPA activation flag bit;
powering off the eSIM card when the LPA activation flag bit indicates that an LPA is not activated, and the first feedback information indicates that the eSIM card is not activated or no activated profile exists in the eSIM card; and
maintaining the eSIM card in a power-on state when the LPA activation flag bit indicates that the LPA is activated, or the first feedback information indicates that an activated profile exists in the eSIM card.

12. A chip, comprising:
at least one processor;
a modem; and
one or more computer programs, wherein the one or more programs are stored in the modem, the one or more computer programs comprise instructions, and when the instructions are executed by the chip, the chip is enabled to perform the following steps:
after an initialization process is completed, driving an eSIM card to be powered on;
sending a first indication to the eSIM card, wherein the first indication queries whether an activated profile exists in the eSIM card, and the first indication is issuer security domain root (ISD-R) selection request information;
obtaining first feedback information sent by the eSIM card, wherein the first feedback information is ISD-R response information, the ISD-R response information comprises a field enabledProfile (2), and wherein the enabledProfile (2) indicates whether an embedded universal integrated circuit card (eUICC) comprises an activated profile; and powering off the eSIM card when the first feedback information indicates that no activated profile exists in the eSIM card.

13. The chip according to claim 12, wherein the chip is further enabled to perform the following step:

after obtaining the first feedback information sent by the eSIM card, maintaining the eSIM card in a power-on state when the first feedback information indicates that an activated profile exists in the eSIM card.

14. The chip according to claim 12, wherein the chip is further enabled to perform the following steps:

before driving the eSIM card to be powered on or before sending the first indication to the eSIM card, obtaining a local profile assistant (LPA) activation flag bit, wherein the LPA activation flag bit indicates whether an LPA is activated; and when the LPA activation flag bit indicates that the LPA is activated, maintaining the eSIM card in the power-on state.

15. The chip according to claim 14, wherein the chip is further enabled to perform the following step:

after obtaining the LPA activation flag bit, when the LPA activation flag bit indicates that the LPA is not activated, sending the first indication to the eSIM card.

16. The chip according to claim 14, wherein the chip is further enabled to perform the following steps:

before obtaining the LPA activation flag bit, obtaining a first setting request, wherein the first setting request is triggered when a user enables the LPA, and the first setting request indicates the modem to set the LPA activation flag bit to activated; and setting the LPA activation flag bit to activated in response to the first setting request.

17. The chip according to claim 16, wherein the chip is further enabled to perform the following steps:

after setting the LPA activation flag bit to activated, obtaining a second setting request, wherein the second setting request is triggered by disabling the LPA by the user when the eSIM card is in the power-on state, and the second setting request indicates the modem to set the LPA activation flag bit to inactivated; and setting the LPA activation flag bit to inactivated in response to the second setting request.

18. The chip according to claim 16, wherein the chip is further enabled to perform the following steps:

after setting the LPA activation flag bit to activated, and before obtaining the LPA activation flag bit, obtaining a power-on request, wherein the power-on request is triggered by the LPA when the eSIM card is not powered on; and in response to the power-on request, driving the eSIM card to be powered on.

19. The chip according to claim 12, wherein the ISD-R response information comprises the following fields: IpaeUsingCatSupported (0) and IpaeUsingScwsSupported (1);

IpaeUsingCatSupported (0) indicates whether the eUICC supports a card application toolkit; and IpaeUsingScwsSupported (1) indicates whether the eUICC supports a smart card web server.

20. The chip according to claim 12, wherein the chip is further enabled to perform the following steps:

obtaining an LPA activation flag bit;

powering off the eSIM card when the LPA activation flag bit indicates that an LPA is not activated, and the eSIM card activation indicator indicates that the eSIM card is not activated or no activated profile exists in the eSIM card; and maintaining the eSIM card in a power-on state when the LPA activation flag bit indicates that the LPA is activated, or the eSIM card activation indicator indicates that an activated profile exists in the eSIM card.

* * * * *

UNITED STATES PATENT AND TRADEMARK OFFICE
CERTIFICATE OF CORRECTION

| | | |
|---|---|---|
| PATENT NO. | : 12,401,987 B2 | Page 1 of 1 |
| APPLICATION NO. | : 17/759981 | |
| DATED | : August 26, 2025 | |
| INVENTOR(S) | : Pang et al. | |

It is certified that error appears in the above-identified patent and that said Letters Patent is hereby corrected as shown below:

In the Claims

In Column 28, in Claim 10, Line 30, delete "IpaeUsingCatSupported (0) and IpaeUsingScwsSupported" and insert -- lpaeUsingCatSupported (0) and lpaeUsingScwsSupported --.

In Column 28, in Claim 10, Line 32, delete "IpaeUsingCatSupported" and insert -- lpaeUsingCatSupported --.

In Column 28, in Claim 10, Line 34, delete "IpaeUsingScwsSupported" and insert -- lpaeUsingScwsSupported --.

In Column 30, in Claim 19, Line 20, delete "IpaeUsingCatSupported (0) and IpaeUsingScwsSupported" and insert -- lpaeUsingCatSupported (0) and lpaeUsingScwsSupported --.

In Column 30, in Claim 19, Line 22, delete "IpaeUsingCatSupported" and insert -- lpaeUsingCatSupported --.

In Column 30, in Claim 19, Line 24, delete "IpaeUsingScwsSupported" and insert -- lpaeUsingScwsSupported --.

Signed and Sealed this
Twenty-first Day of October, 2025

John A. Squires
*Director of the United States Patent and Trademark Office*